March 17, 1964 W. H. PUTERBAUGH ETAL 3,125,673

ELECTROCHEMICAL DATA STORAGE AND COUNTING SYSTEMS

Filed June 10, 1960 10 Sheets-Sheet 1

INVENTORS
WILLIAM H. PUTERBAUGH
RICHARD M. CLINEHENS
ROGER W. MORIN
HANS SCHROEDER
HERMAN E. AUSTEN
BY Louis A. Kline
John J. Callahan
THEIR ATTORNEYS INVENTORS
WILLIAM H. PUTERBAUGH
RICHARD M. CLINEHENS
ROGER W. MORIN
HANS SCHROEDER
HERMAN E. AUSTEN
BY Louis A Kline
John J. Callahan
THEIR ATTORNEYS

ELECTROCHEMICAL DATA STORAGE AND COUNTING SYSTEMS

INVENTORS
WILLIAM H. PUTERBAUGH
RICHARD M. CLINEHENS
ROGER W. MORIN
HANS SCHROEDER
HERMAN E. AUSTEN

BY Louis A. Kline
John J. Callahan

THEIR ATTORNEYS

ELECTROCHEMICAL DATA STORAGE AND COUNTING SYSTEMS

Filed June 10, 1960 10 Sheets-Sheet 4

INVENTORS—WILLIAM H. PUTERBAUGH, RICHARD M. CLINEHENS, ROGER W. MORIN, HANS SCHROEDER & HERMAN E. AUSTEN

BY Louis A. Kline
John J. Callahan

THEIR ATTORNEYS

INVENTORS—WILLIAM H. PUTERBAUGH, RICHARD M. CLINEHENS,
ROGER W. MORIN, HANS SCHROEDER & HERMAN E. AUSTEN

BY Louis A. Kline
John J. Callahan

THEIR ATTORNEYS

INVENTORS—WILLIAM H. PUTERBAUGH, RICHARD M. CLINEHENS, ROGER W. MORIN, HANS SCHROEDER & HERMAN E. AUSTEN

BY Louis A. Kline
John J. Callahan
THEIR ATTORNEYS

ELECTROCHEMICAL DATA STORAGE AND COUNTING SYSTEMS

Filed June 10, 1960 10 Sheets-Sheet 7

INVENTORS—WILLIAM H. PUTERBAUGH, RICHARD M. CLINEHENS, ROGER W. MORIN, HANS SCHROEDER & HERMAN E. AUSTEN

BY Louis A Kline
John J. Callahan
THEIR ATTORNEYS

ELECTROCHEMICAL DATA STORAGE AND COUNTING SYSTEMS

INVENTORS
WILLIAM H. PUTERBAUGH
RICHARD M. CLINEHENS
ROGER W. MORIN
HANS SCHROEDER
HERMAN E. AUSTEN

BY Louis A. Kline
John J. Callahan
THEIR ATTORNEYS

ELECTROCHEMICAL DATA STORAGE AND COUNTING SYSTEMS

Filed June 10, 1960 10 Sheets-Sheet 9

INVENTORS
WILLIAM H. PUTERBAUGH
RICHARD M. CLINEHENS
ROGER W. MORIN
HANS SCHROEDER
HERMAN E. AUSTEN

BY Louis A Kline
John J. Callahan

THEIR ATTORNEYS

ELECTROCHEMICAL DATA STORAGE AND COUNTING SYSTEMS

Filed June 10, 1960 10 Sheets-Sheet 10

INVENTORS
WILLIAM H. PUTERBAUGH
RICHARD M. CLINEHENS
ROGER W. MORIN
HANS SCHROEDER
HERMAN E. AUSTEN

BY Louis A. Kline
John J. Callahan
THEIR ATTORNEYS

United States Patent Office 3,125,673

Patented Mar. 17, 1964

3,125,673

ELECTROCHEMICAL DATA STORAGE AND COUNTING SYSTEMS

William H. Puterbaugh, Waynesville, Richard M. Clinehens, Dayton, Roger W. Morin, Waynesville, Hans Schroeder, Bellbrook, and Herman E. Austen, Trotwood, Ohio, assignors to The National Cash Register Company, Dayton, Ohio, a corporation of Maryland (incorporated in 1926)

Filed June 10, 1960, Ser. No. 35,265
27 Claims. (Cl. 235—92)

This invention relates to an electrochemical data storage and counting system and, more particularly, to such a system which may be combined with a cash register or other accounting machine to accomplish unit or inventory control.

The cash register is a machine which assists a merchant in the exchange of money for merchandise. The safeguarding of this exchange is of prime importance to any business, and the cash register has provided balances and checks for the regulation of it.

It has been realized that as much as possible in the way of record keeping should be accomplished at the time a sales transaction is recorded by the cash register. Hence, it has been proposed that the cash register be used to accomplish unit or inventory control so as to provide a merchant with a current record of the number and kinds of items which he has available for sale. The cash register itself has not been utilized fully to accomplish unit or inventory control, since a large number of storage or memory devices are necessary in order to accomplish it. For instance, the departments served by one cash register in a department store will often have several hundred different kinds of merchandise exchanged through them. In order for the cash register itself to accomplish unit or inventory control, a large number of mechanical totalizers or other storage devices would be needed, which in turn would necessitate a very complex and expensive machine. For this reason, perforated cards and tapes have been utilized as media to record sales and keep account of the merchandise that a merchant has available for immediate sale, but the utilization of perforated cards and tapes in turn necessitates the use of other equipment, such as sorters, tabulators, and computers, for the final analysis of the data recorded on these media.

It is therefore a general object of this invention to provide a compact and efficient electrochemical data storage and counting system of economical construction that is especially suitable for accomplishing unit or inventory control.

It is another object of this invention to provide an electrochemical data storage and counting system including a cash register or other accounting machine, in which the cash register controls certain operations of the electrochemical storage and counting system.

It is a further object of this invention to provide an electrochemical data storage and counting system which utilizes a reversible electrochemical storage device as an accumulator or totalizer, whereby the writing or storage of data therein and the readout of the stored data there from may be effected.

It is a still further object of this invention to provide an electrochemical data storage and counting system for accounting for units of data, comprising an electrochemical storage device having a cathode electrode and an anode electrode, and wherein an amount of the anode electrode material plated on the cathode electrode represents a selected number of the units of data.

It is a still further object of this invention to provide an electrochemical data storage and counting system for accounting for units of data of different classifications, comprising an electrochemical storage device having an anode electrode and a plurality of cathode electrodes, and wherein an amount of the anode electrode material plated on selected cathode electrodes represents a selected number of the units of data of a certain classification.

It is a still further object of this invention to provide a new and novel electrochemical data storage and counting system comprising a reversible electrochemical storage device wherein the endpoint of a readout operation of the storage device may be reliably ascertained.

It is a still further object of this invention to provide an electrochemical data storage and counting system comprising an electrochemical storage device having a plurality of cathode electrodes for storing units of data of various classifications, and means for selecting any cathode electrode thereof for the writing or storage of the units of data thereon, or for the readout of stored units of data therefrom.

It is a still further object of this invention to provide an electrochemical data storage and counting system of the above type which is provided with means for indicating the number of units of data read out from one or more cathode electrodes thereof.

It is a still further object of this invention to provide an electrochemical data storage and counting system comprising an electrochemical data storage device having a plurality of cathode electrodes, and means for reading out automatically the data from each of the cathode electrodes individually and in succession.

With these and incidental objects in view, the invention includes certain novel features of construction and combination of parts, a preferred form or embodiment of which is hereinafter described with reference to the drawings which accompany and form a part of this specification.

FIGS. 6, 7, 8, and 9, taken together, constitute a schematic diagram of the circuits and the mechanism of the electrochemical data storage and counting system.

Figure 10:
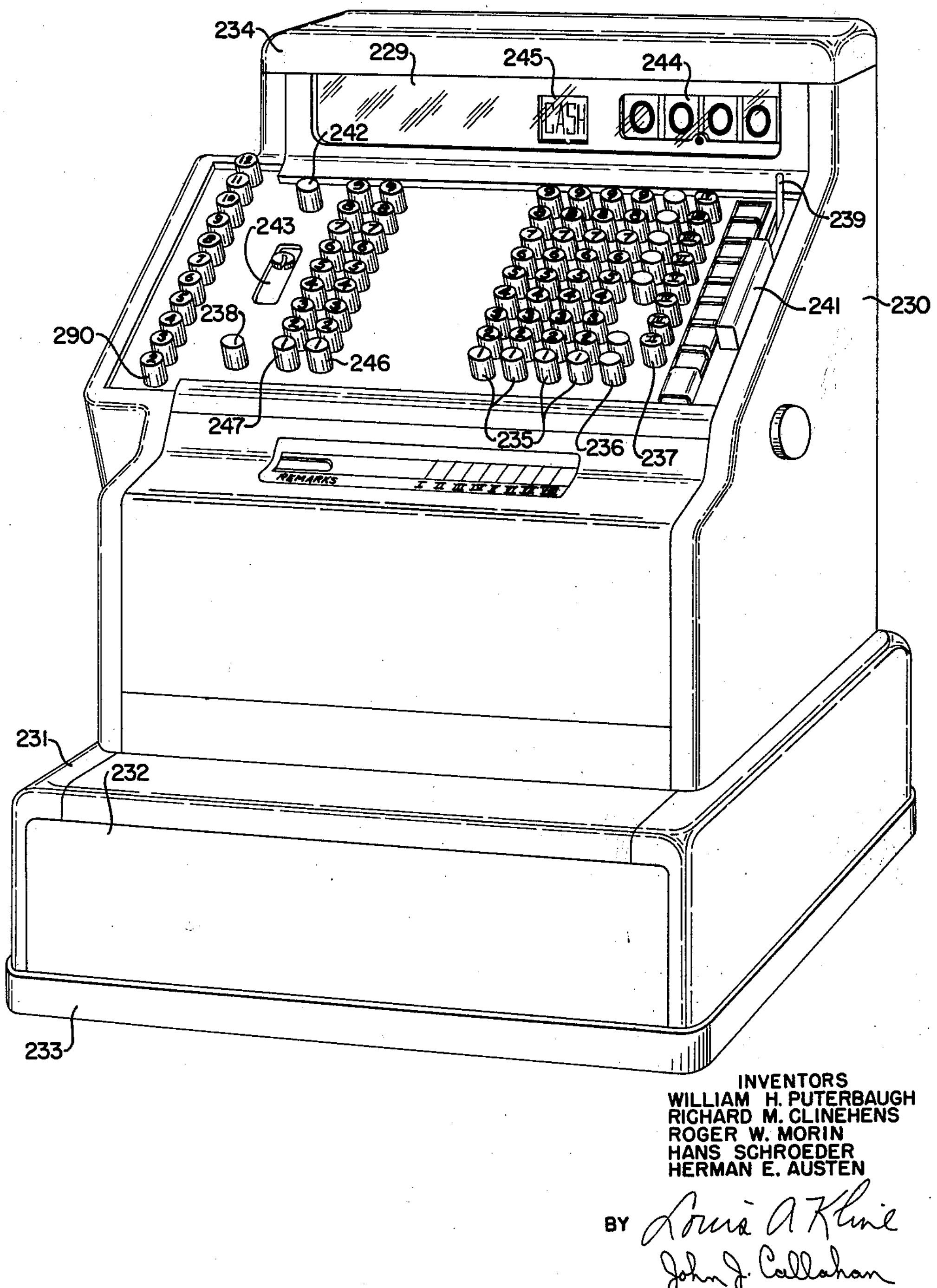

FIG. 10 is a perspective view of the cash register which is utilized to control certain operations of the electrochemical data storage and counting system.

Figures 11, 12:
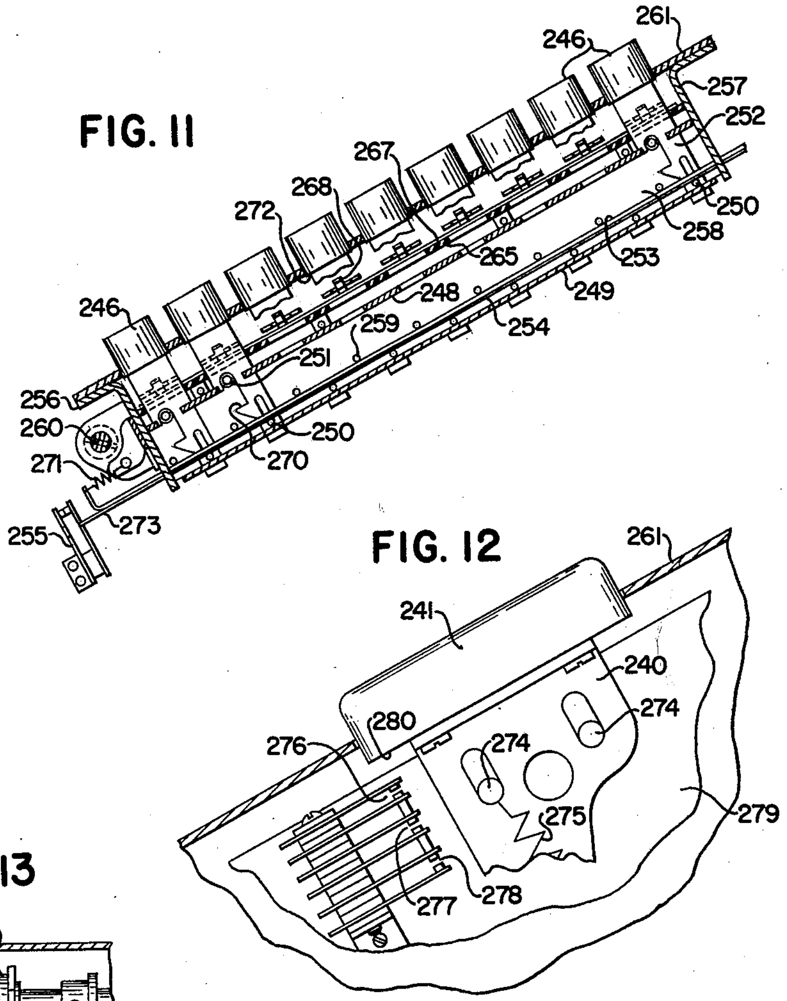

FIG. 11 is a cross-sectional view, taken just to the right of one of the rows of classification keys, showing that row and the switches controlled thereby.

FIG. 12 is a right side view of the cash register, showing the machine releasing and operating mechanism and the switches controlled thereby.

Figure 13:
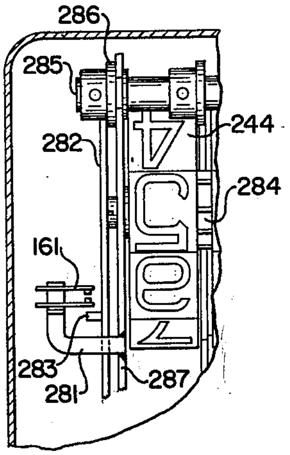

FIG. 13 is a view observed from the back of the cash register, showing the control mechanism for operating the control switch for commencing a storing or writing operation of the electrochemical data storage and counting system.

Figure 14:
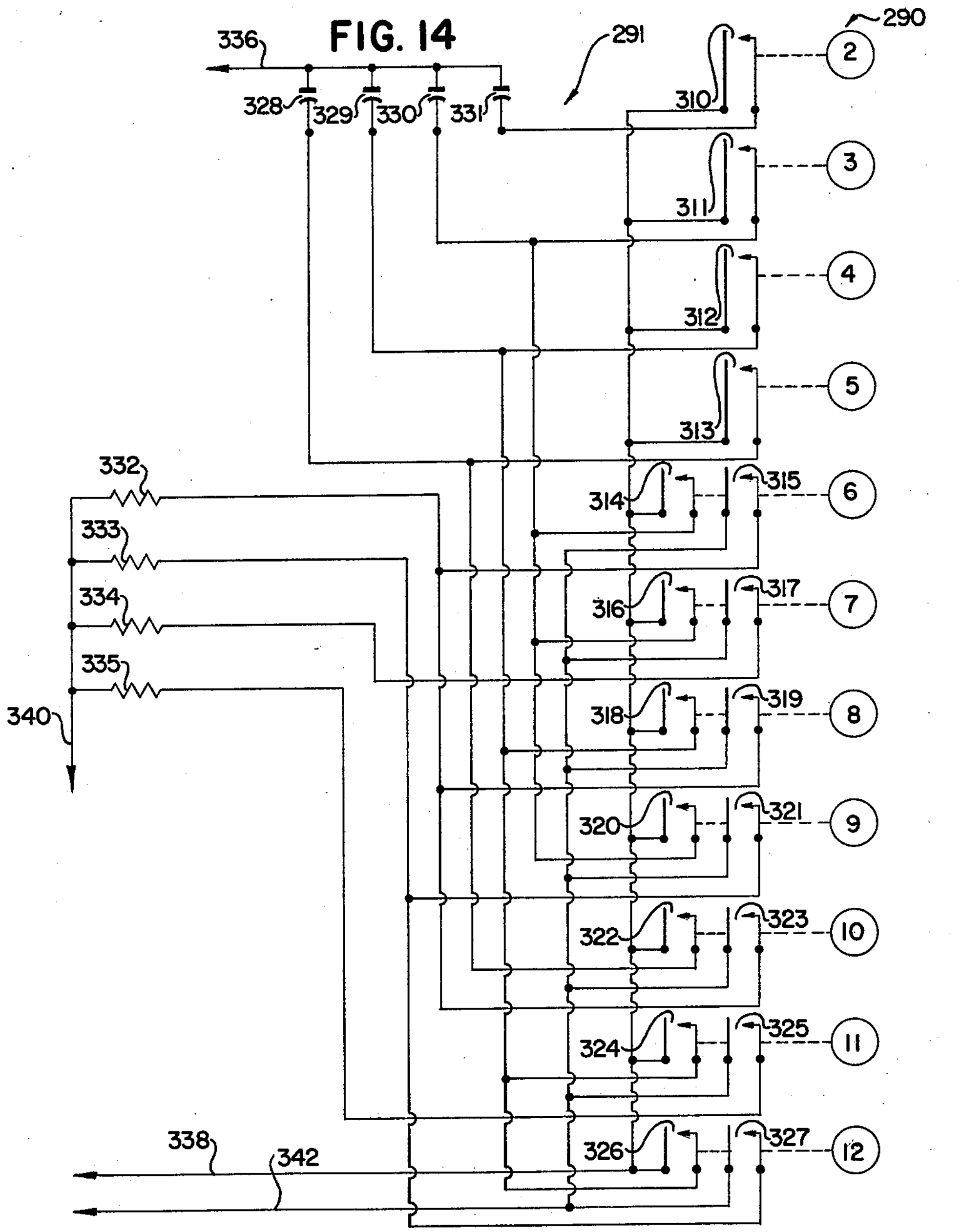

FIG. 14 is a schematic diagram which, together with the schematic diagrams of FIGS. 6, 7, 8, and 9, constitutes means to effect multiple storing or writing operations automatically with respect to a single cathode electrode of the storage device.

Figure 1:
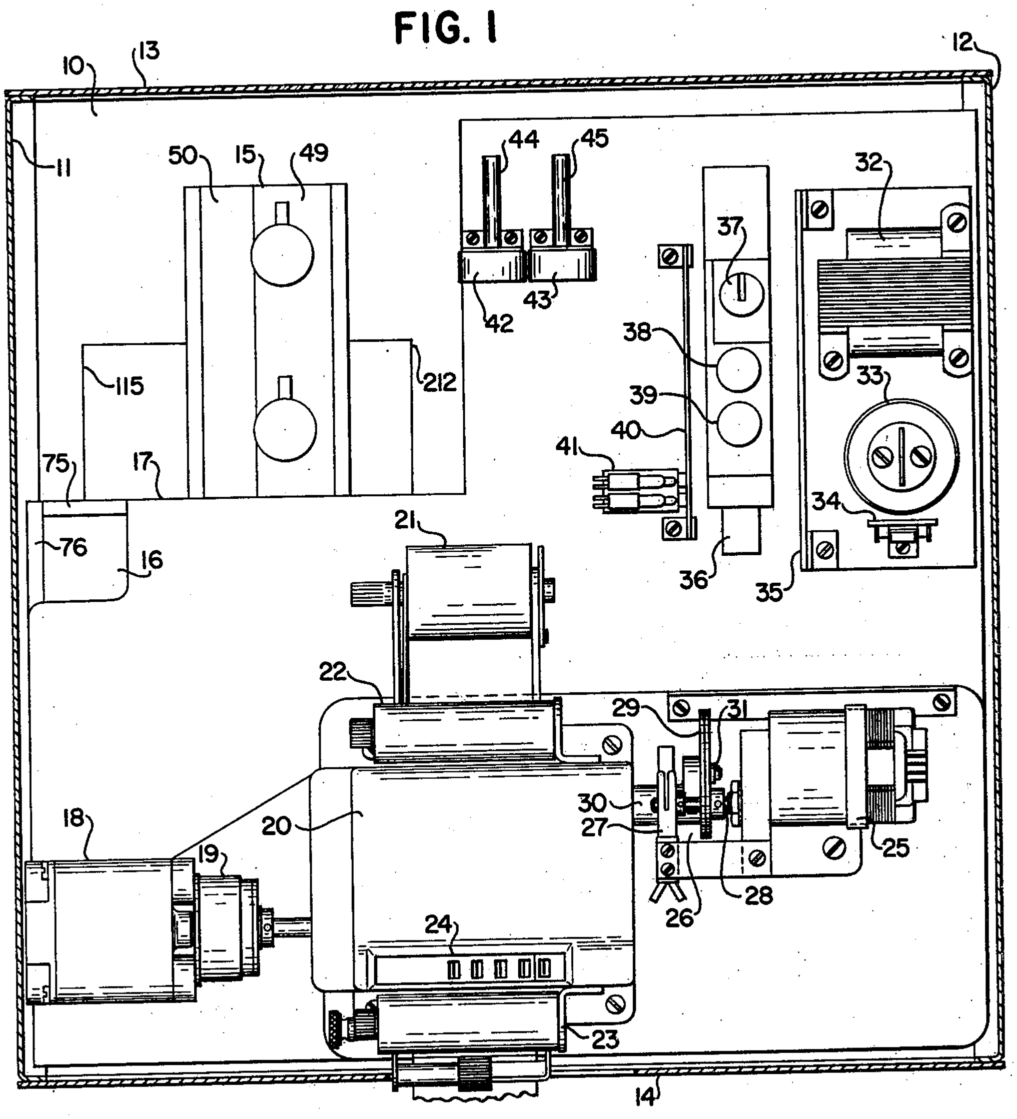
FIG. 1 is a top view of the electrochemical data storage and counting system, showing the arrangement of certain parts thereof, including the electrochemical data storage device, the selector unit, the timing motor, the clutch, and the counter and printer.
Figures 2, 3, 4:
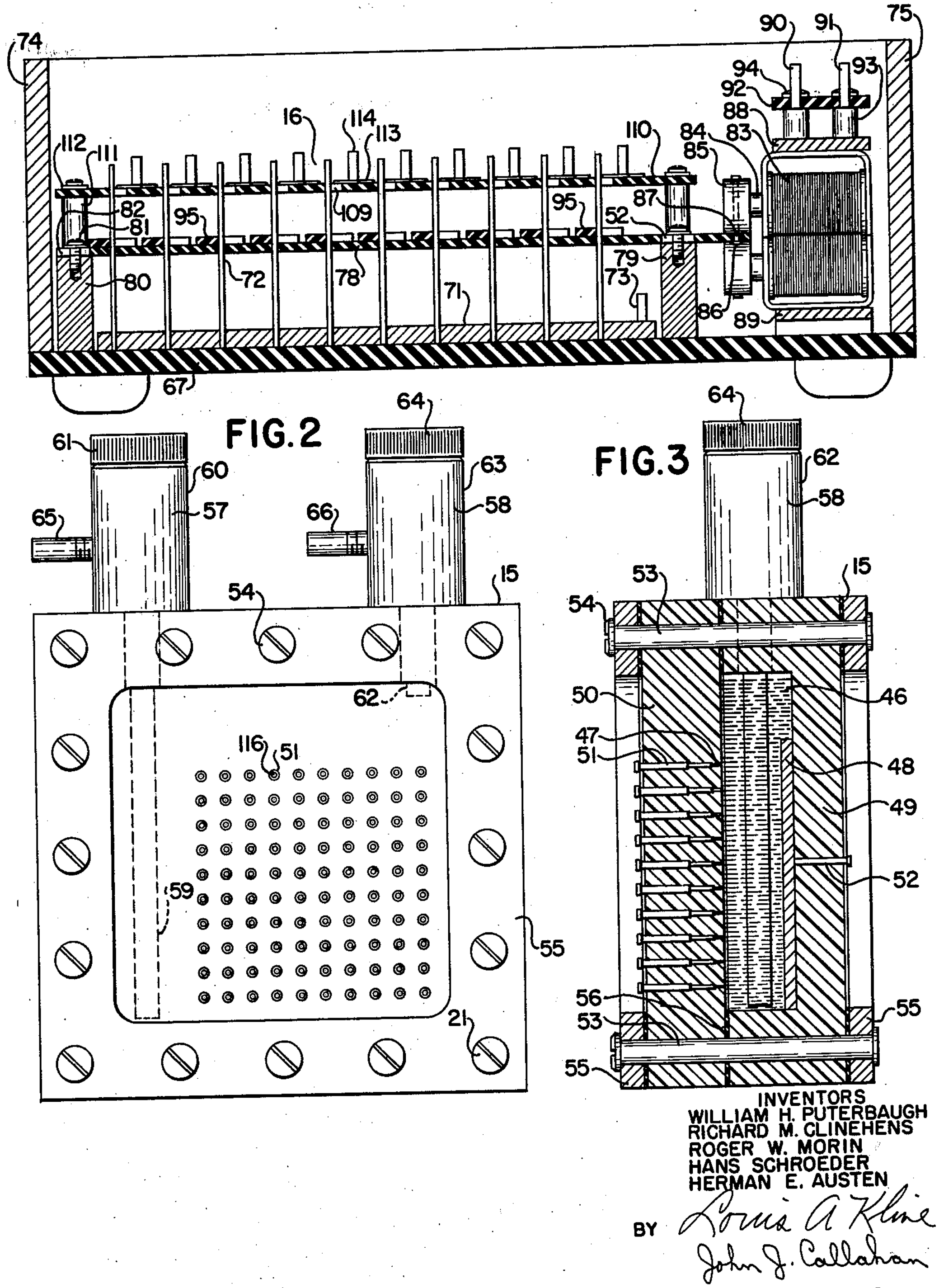
FIG. 2 is a front view of the electrochemical data storage device.
FIG. 3 is a side view of the electrochemical data storage device, showing the electrodes thereof.
FIG. 4 is a side view of a portion of the selector unit taken along the line A—A of FIG. 5.

Referring first to FIGS. 1, 2, and 3, the electrochemical data storage and counting system 10 is housed in a cabinet having side walls 11 and 12, a rear wall 13, and a front wall 14. The system 10 comprises an electrochemical storage device 15; a selector or switch unit 16, indicated as located under a support plate 17; a timing motor 18; a clutch 19; a counter and printer 20, provided with a supply of paper 21; ribbon rollers 22 and 23; a count indicator 24; a motor 25, for operating the printer of the counter and printer 20; a drive connection, indicated generally at 26, between the motor 25 and the counter and printer 20; and a pair of cam-operated switches, of which one, 27, is shown in FIG. 1. The drive connection at 26 comprises a drive shaft 28, extending from the motor 25. The drive shaft 28 carries a slotted cam 29. An arm 30 is rotatably supported from the side of the counter and printer 20, and it carries a roller 31 at its free end. When the motor 25 is caused to operate, the cam 29 on the drive shaft 28 actuates the roller 31 and the arm 30 to cause a printing operation and to cause the counter of the counter and printer 20 to be reset. Another cam (not shown) carried by the drive shaft 28, will cause the switches (one shown at 27) to be closed. At the end of the cycle of operation of the counter and printer 20, these cam-operated switches will be opened, and the system is then ready to repeat another cycle of operation.

An example of a suitable motor for the timing motor 18 is the synchronous motor, type KYC–23RB, manufactured by Bodine Electric Company, Chicago, Illinois, United States of America. An example of a suitable clutch for the clutch 19 is the clutch, size SF–160, manufactured by Warner Electric Brake and Clutch Company, Beloit, Wisconsin, United States of America. An example of the counter and printer assembly comprising the counter and printer 20, the drive connection at 26, and the motor 25 is the assembly, model U272, manufactured by Irion & Vosseler, Schwenningen, Germany.

FIG. 1 also shows the power supply for the data storage and counting system 10, including a transformer 32 and a filter capacitor 33.

A terminal board 34 is provided for mounting other components of the power supply. To the left of the power supply, there is provided a panel 35 for mounting various other elements of the system 10, including transistors. A support structure 36 is provided for mounting a rotary read key 37, having a lock which is adapted to be rotated by the possessor of a key to the lock, a depressible read-one key 38, and a depressible read-all key 39. The support structure 36 also supports a key release solenoid 216 (FIG. 6) and the various switches assoicated with the keys 38 and 39, the purpose and function of which will be understood when the electrical operation of the system 10 is described in connection with the schematic diagrams of FIGS. 6, 7, 8, and 9. Another support structure, 40, is provided for mounting the electronic circuits and the relays 148 and 149, one of which is shown at 41 and which are found in the schematic diagram of FIG. 6. Finally, a pair of adjustable resistors 42 and 43 are shown mounted on the support plate 17, and each of these is provided with a rotary shaft 44 and 45, respectively, to facilitate adjustment of current flow in certain portions of the circuit of FIGS. 6, 7, 8, and 9.

Referring now to FIGS. 2 and 3 in detail, the electrochemical storage device 15 comprises an acidified copper sulfate solution 46, which serves as an electrolyte or electroplating bath; one hundred cathode electrodes 47; and a common anode electrode 48. An enclosure for the storage device 15 is formed of epoxy casting resins (Epon–185) and is cast in two parts, 49 and 50. The part 49 contains the common anode electrode 48, and the part 50 contains the one hundred cathode electrodes 47. The cathode electrodes 47 are secured to standard taper pin connectors 51 and are cast in place. Only the ends of the cathode electrodes 47 are in contact with the solution 46. The common anode electrode 48 is secured to a standard connector 52, which is also cast in place. The two parts 49 and 50 of the storage device 15 are secured together by means of threaded studs 53, which receive screws 54. A metal frame 55 is provided on each side of the storage device 15. A polyvinyl gasket 56 is used to seal the two parts 49 and 50 of the storage device 15 together.

The storage device 15 is filled with the solution 46 by using nylon conduits 57 and 58. One end 59 of the conduit 57 is located at a point near the bottom of the storage device 15. The other end 60 of the conduit 57 is threaded to receive a needle valve 61. One end 62 of the conduit 58 is located at a point near the top of the storage device 15. The other end 63 of the conduit 58 is threaded to receive a needle valve 64. The conduits 57 and 58 are provided with an inlet tube 65 and an exhaust tube 66, respectively. The copper sulfate solution or electrolyte 46 enters into the storage device 15 through either of the conduits 57 and 58. In addition, the needle valves 61 and 64 provide a means for causing deoxygenation of the solution 46. Thus, the storage device 15 is made a closed system, and a supply of nitrogen is supplied by means of the inlet tube 65 to the solution 46 and is bubbled through it. The oxygen removed from the solution 46 by the above process is then carried from the storage device 15 by way of the exhaust tube 66. The above deoxygenation of the solution 46 increases the stability of the material of the anode electrode 48 when it is plated on the cathode electrodes 47.

The one hundred cathode electrodes 47 of the storage device 15 may serve as individual accumulators or totalizers. One or more of the electrodes 47 may correspond to a certain type of merchandise to be accounted for. In the specific embodiment of the storage device 15 which was constructed and tested, each of the one hundred cathode electrodes 47 was found to have the capacity to store approximately ten thousand predetermined and discrete amounts of the material of the anode electrode 48 electrodeposited thereon from the solution 46. A plating current pulse having a substantially fixed current-time integral was utilized to account for each unit of data, and it was found that approximately ten millimicrograms of the material of the anode electrode 48 was electrodeposited on a selected cathode electrode 47 in response to this plating current pulse. Thus, in the specific embodiment of the storage device 15, each of the cathode electrodes 47 has the capacity to account for approximately ten thousand units of data.

In the specific embodiment of the storage device which was constructed and tested, the composition of the electrolyte 46 was: 250 g./l. $CuSO_4 \cdot 5H_2O$; 41 ml./l. $H_2SO_4$; and 10 g./l. $Na_2SO_3$. The cathode electrodes 47 were platinum, and the anode electrode 48 was electrolytic copper. The copper sulfate, sulfuric acid, and sodium sulfite combination for the electrolyte 46 was found to be extremely reliable. This combination was also found to be very stable if oxygen was eliminated in a closed system in the manner hereinbefore described. It was found advantageous to include sodium sulfite in the electrolyte 46 to act as a "getter" for oxygen traces that are formed during the readout operation of the storage device 15.

To accomplish a storing operation relative to a selected cathode electrode 47 of the storage device 15, a plating current pulse, having a substantially fixed current-time integral for each unit of data to be accounted for, is caused to flow between the anode electrode 48 and the selected cathode electrode 47. In response to this plating current pulse, an amount of the material of the anode electrode 48 is plated on the selected cathode electrode 47. This amount of plated material represents a selected number of units of data to be accounted for.

To accomplish a readout operation relative to a selected cathode electrode 47 of the storage device 15, a deplating current of a substantially fixed amplitude is caused to flow between the selected cathode electrode 47 and the anode electrode 48. In response to this deplating current, the material of the anode electrode 48 is completely deplated from the selected cathode electrode 47. The time required to completely deplate the material of the anode electrode 48 from the selected cathode electrode 47 is determined, and this time is then translated into a reading which is indicative of the number of units of data previously represented on the selected cathode electrode 47.

The end point of a readout operation concerning a selected cathode electrode 47—that is, the time when the material of the anode electrode 48 is completely deplated from a selected cathode electrode 47 is indicated by a change in voltage which occurs in the deplating circuit due to the change of electrode potential from that of the material of the anode electrode 48 to that of the selected cathode electrode 47. When the materials for the cathode electrodes 47 and the anode electrode 48 are dissimilar, then the above change in voltage will occur in the deplating circuit.

In the illustrative embodiment of the present invention, the cathode electrodes 47 are preferably one of the noble metals—that is, platinum—while the anode electrode 48 is electrolytic copper, but it is to be understood that any dissimilar materials may be used in the storage device 15 as long as suitable means are provided for detecting the change in voltage which occurs in the deplating circuit when the material of the anode electrode 48 is entirely deplated from a cathode electrode 47.

Figure 5:
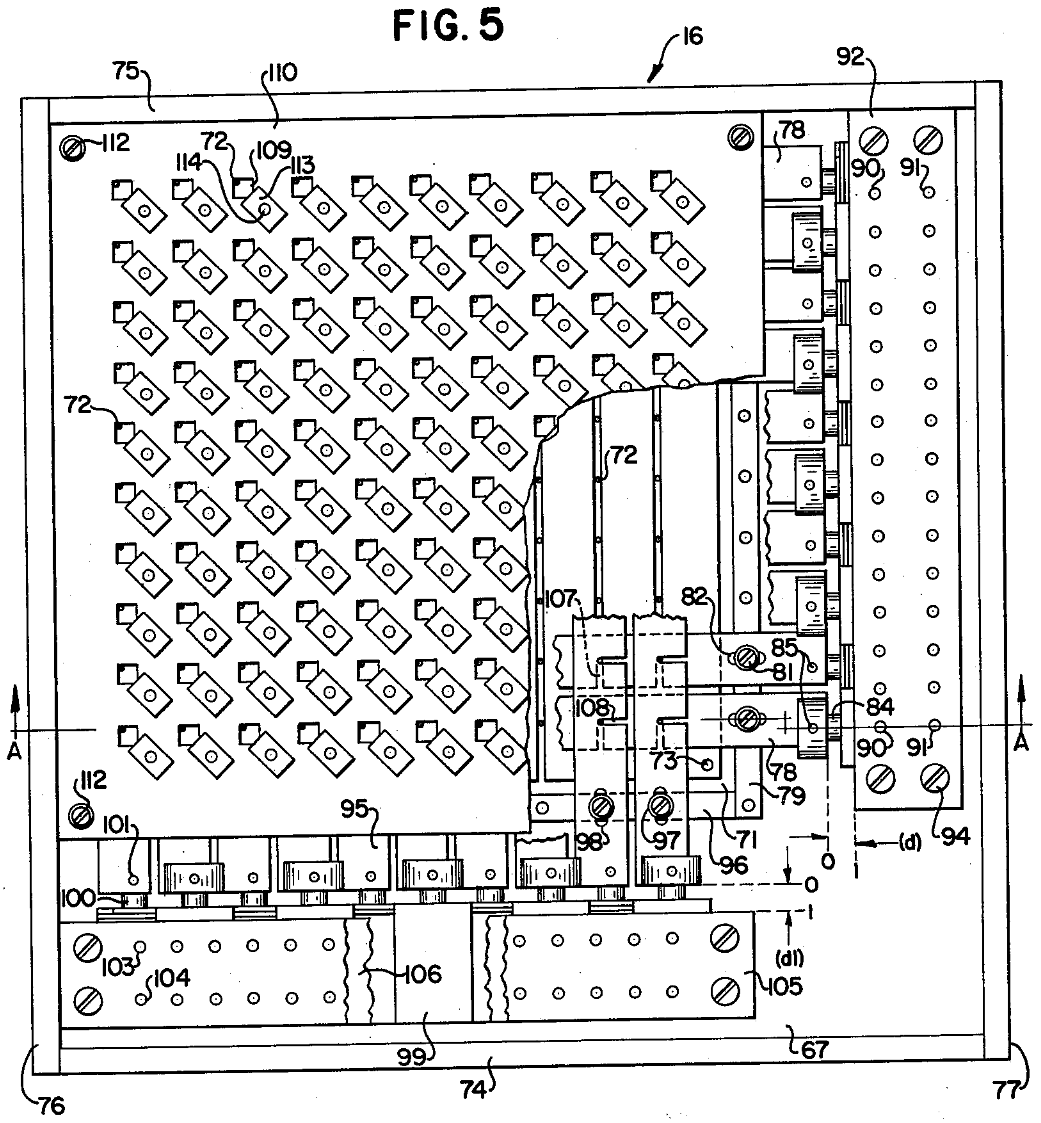
FIG. 5 is a top view of the selector unit, with a portion broken away to show some of the details thereof.

Referring now to FIGS. 4 and 5, there is shown one embodiment of a selector or switch unit which is used to select one of the cathode electrodes 47 for a storing operation or for a readout operation.

The selector unit 16 comprises a rectangular metallic plate 71, in which are embedded one hundred elongated flexible annular contact members 72. The plate 71 is provided with a terminal 73 (FIGS. 4 and 8) for supplying plating and deplating currents to the selector unit.

The selector unit 16 is contained in an enclosure having a bottom 67, of insulating material, and front, rear, and side walls 74 to 77, respectively, of metallic material.

The selector unit 16 is provided with ten elongated rectangular switching beams 78, of insulating material, which are spaced in a parallel relation to the plate 71 by rectangular metallic side supports 79 and 80. Each of the switching beams 78 is secured to the supports 79 and 80 by means of screw-and-washer combinations 81, the screw portion of which passes through apertures 82, located in and adjacent to the ends of these supports. The apertures 82 are so dimensioned that each of the beams 78 may be moved a distance [(*d*), FIG. 5] between a "zero" position and a "one" position by a solenoid 83, having a magnetic plunger 84. The plunger 84 is connected to one of the ends of the beam 78 by any suitable means, such as the actuator pin 85, whose end 86 is received by holes 87, formed in and near one end of the beam. Five of the solenoids 83 are supported from a top mounting plate 88 (FIG. 4), the ends of which are attached to a pair of side support plates (not shown). The pair of support plates extend from the bottom 67 of the selector unit 16. The remaining five solenoids 83 are supported on a bottom mounting plate 89 (FIG. 4), the ends of which also are attached to the pair of side support plates. The solenoids 83 are alternately arranged and staggered in level to provide a compact arrangement. The solenoids 83 are provided with current energizing terminals 90 and 91, which are mounted on an insulating panel 92. The panel 92 is spaced from the mounting plate 88 by means of spacers 93, and it is attached to the side support plates (not shown), which extend from the bottom 67 of the selector unit 16, by means of the screws 94.

Ten other elongated rectangular switching beams 95, of insulating material, similar to the switching beams 78, are situated at right angles to these latter beams. Each of the switching beams 95 is secured to a metallic front support 96 (FIG. 5) and a metallic rear support (not shown) by means of a screw-and-washer combination 97, the screw portion of which passes through apertures 98, located in and adjacent to the ends of these supports. The apertures 98 are so dimensioned that each of the beams 95 may be made to move a distance [(*d*), FIG. 5] between a "zero" position and a "one" position by a solenoid 99, having a magnetic plunger 100. The plunger 100 is connected to one of the ends of the beam 95 by an actuator pin 101, the end of which is received by holes formed in and near one end of the beam. The ten solenoids 99 and plungers 100 are alternately arranged and staggered in level in the same manner as the ten solenoids 83 and plungers 84. The solenoids 99 are provided with current energizing terminals 103 and 104, which are mounted in an insulating panel 105. The panel 105 is spaced from a mounting plate 106. Those solenoids 99 which are positioned higher in level are supported from the plate 106, while those below are supported on another mounting plate (not shown). A pair of side support plates (not shown), which extend from the bottom 67 of the selector unit 16, is provided to support both of the last-mentioned solenoid mounting plates.

Each of the switching beams 78 is provided with ten spaced apertures 107, while each of the ten switching beams 95 is provided with ten spaced apertures 108. When the selector unit 16 is assembled, each of the apertures 107 in the row switching beams 78 is opposite an aperture 108 in a column switching beam 95. A single flexible contact member 72 is passed through each of the opposing apertures 107 and 108 and through a rectangular aperture 109, provided in a top panel 110, of insulating material.

The panel 110 is spaced in parallel relation to the switching beams 78 and 95 by means of side spacers 111, and it is secured to the support members 79, 80, and 96 by means of screw-and-washer combinations 112. The panel 110 carries on its top side a rectangular metallic contact 113 for each of the apertures 109. The contacts 113 are so located that they project over one corner of an aperture 109. Each of the contacts 113 is provided with a terminal 114. From each of the terminals 114, separate lines (one line, 115, is shown in FIG. 1) are used to make a connection to a single cathode electrode 47 in the storage device 15. A line, such as line 115, is plugged into apertures 116 (FIG. 2), which are provided in the pin connectors 51.

The storing or plating current pulses are applied to the selector unit 16 by a pulse generator unit 121, located in an electrical portion of the system 10. The pulse generator unit 121 is coupled by way of a line 305 (FIG. 8) to the terminal 73 of the selector unit 16. The manner of development of the storing or plating current pulses will be made clear when the schematic diagrams of FIGS. 5, 6, 7, 8, and 9 are described hereinafter. The path for the plating current pulses through the selector unit 16 will be by way of the terminal 73, a flexible contact 72, and one of the contacts 113 on the panel 110. The positioning of the switching beam members 78 and 95 determines which one of the contacts 72 and 113 is to be included in the plating current path during a storing operation. For example, should it be desired to move a contact 72 against the contact 113, which is shown in the upper left-hand corner of FIG. 5, the top row solenoid 83 would be energized, thus moving the top row switching beam 78 inwardly to its "one" position. At the same time, the column solenoid 99, which is farthest to the left in FIG. 5, would be energized, thus moving the associated column switching beam 95 inwardly to its "one" position. A flexible contact 72 would thus be urged against the contact 113.

Each one of the flexible contacts 72 and an associated stationary contact 113 serve as a switching means which is associated with a particular one of the cathode electrodes 47. The solenoids 83 and 99 and their energizing circuits serve as control means for controlling the above switching means.

It is seen from the above description of the selector unit 16 that a small and compact arrangement is provided for individually selecting any one of the cathode electrodes 47 of the storage device 15 on which it is desired to write data or from which it is desired to read data.

Figure 6:
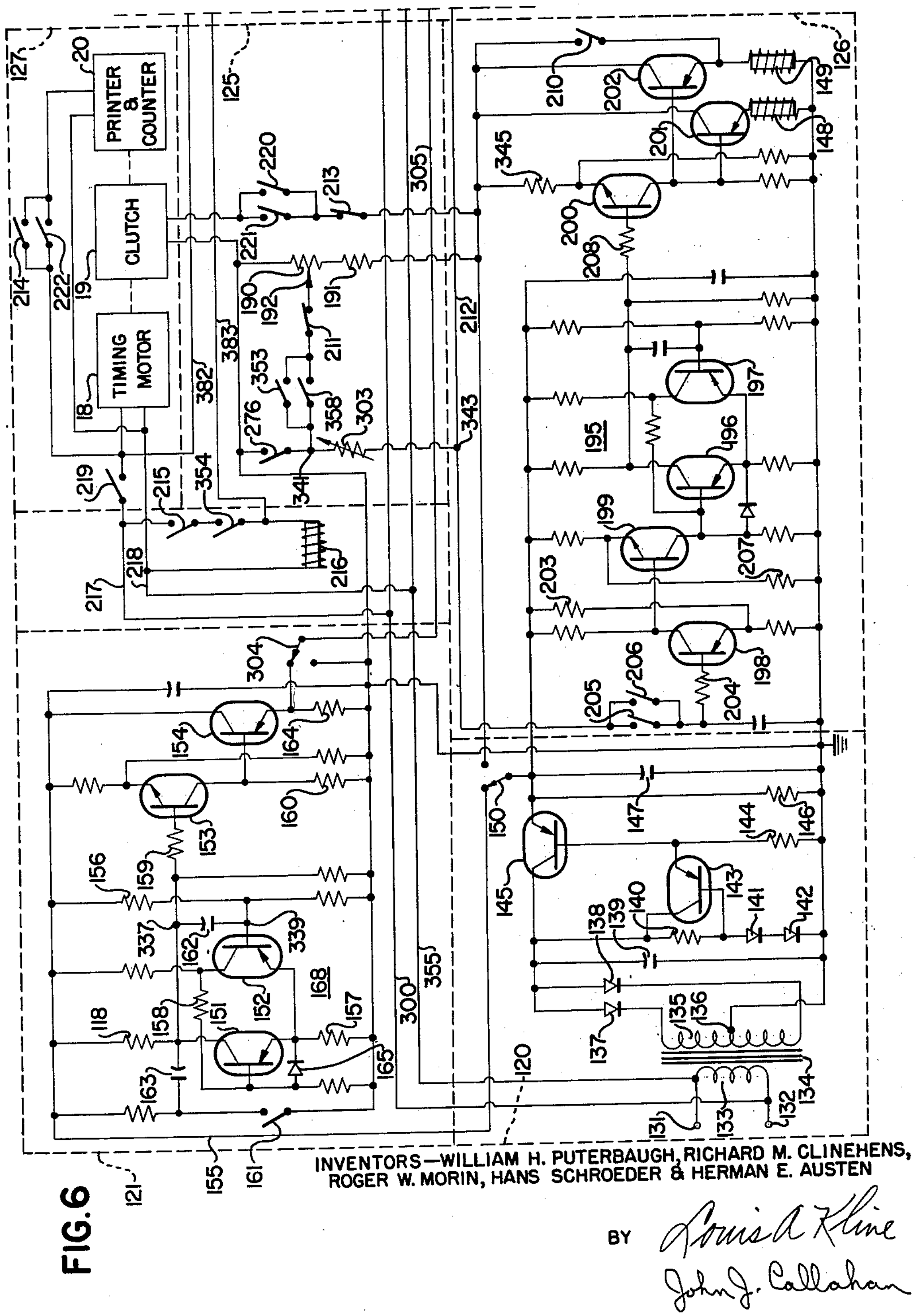
Figure 7:
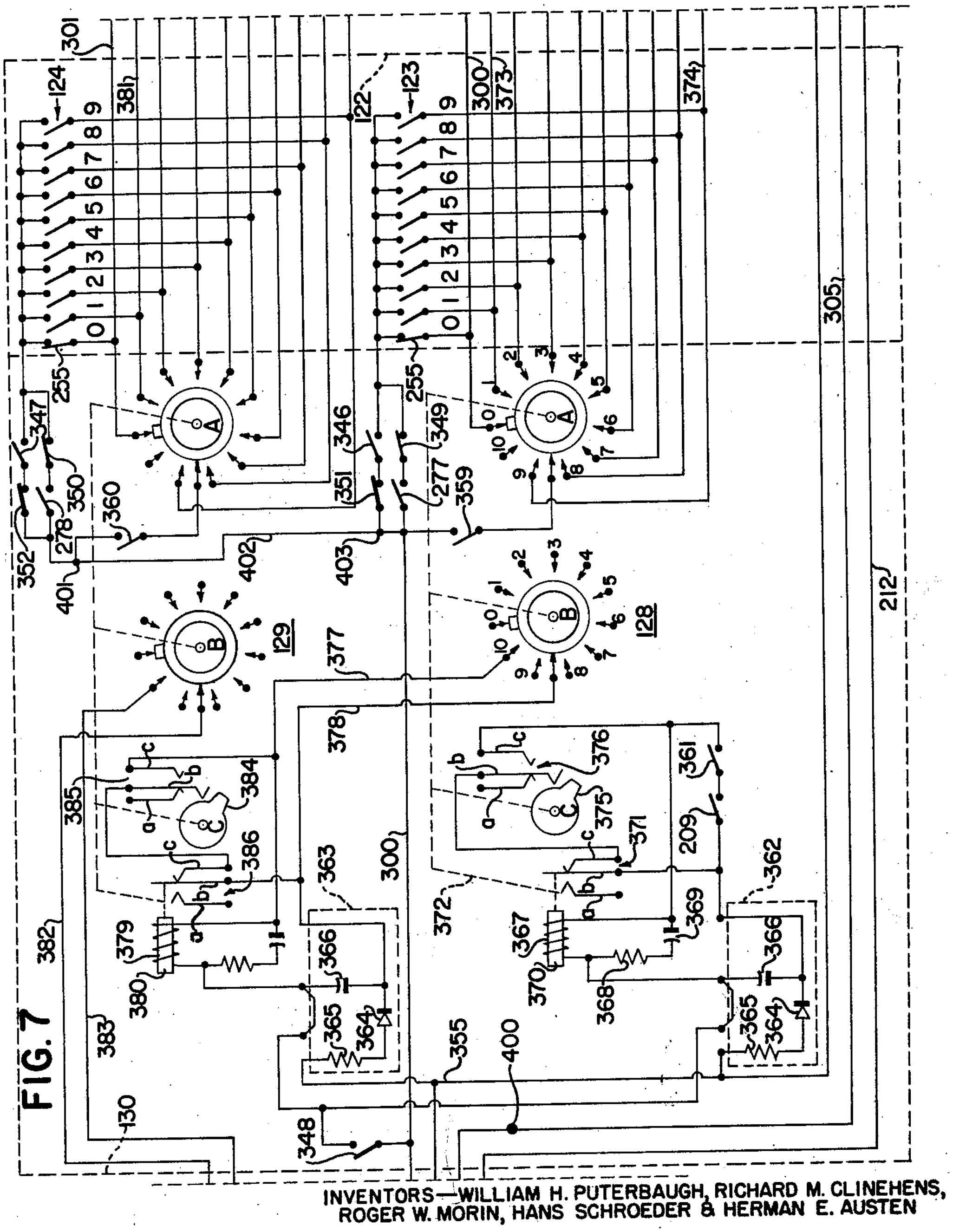
Figure 8:
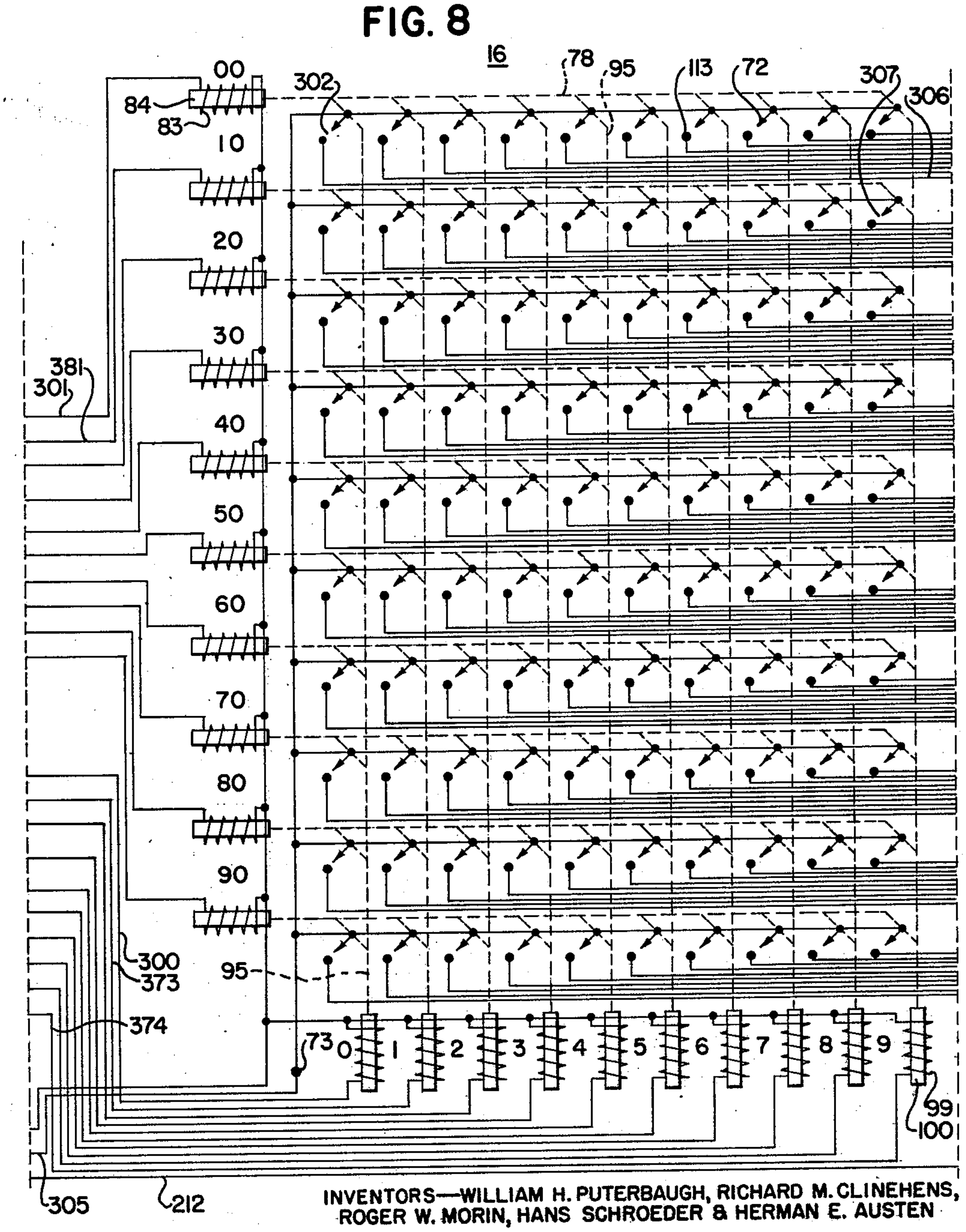
Figure 9:
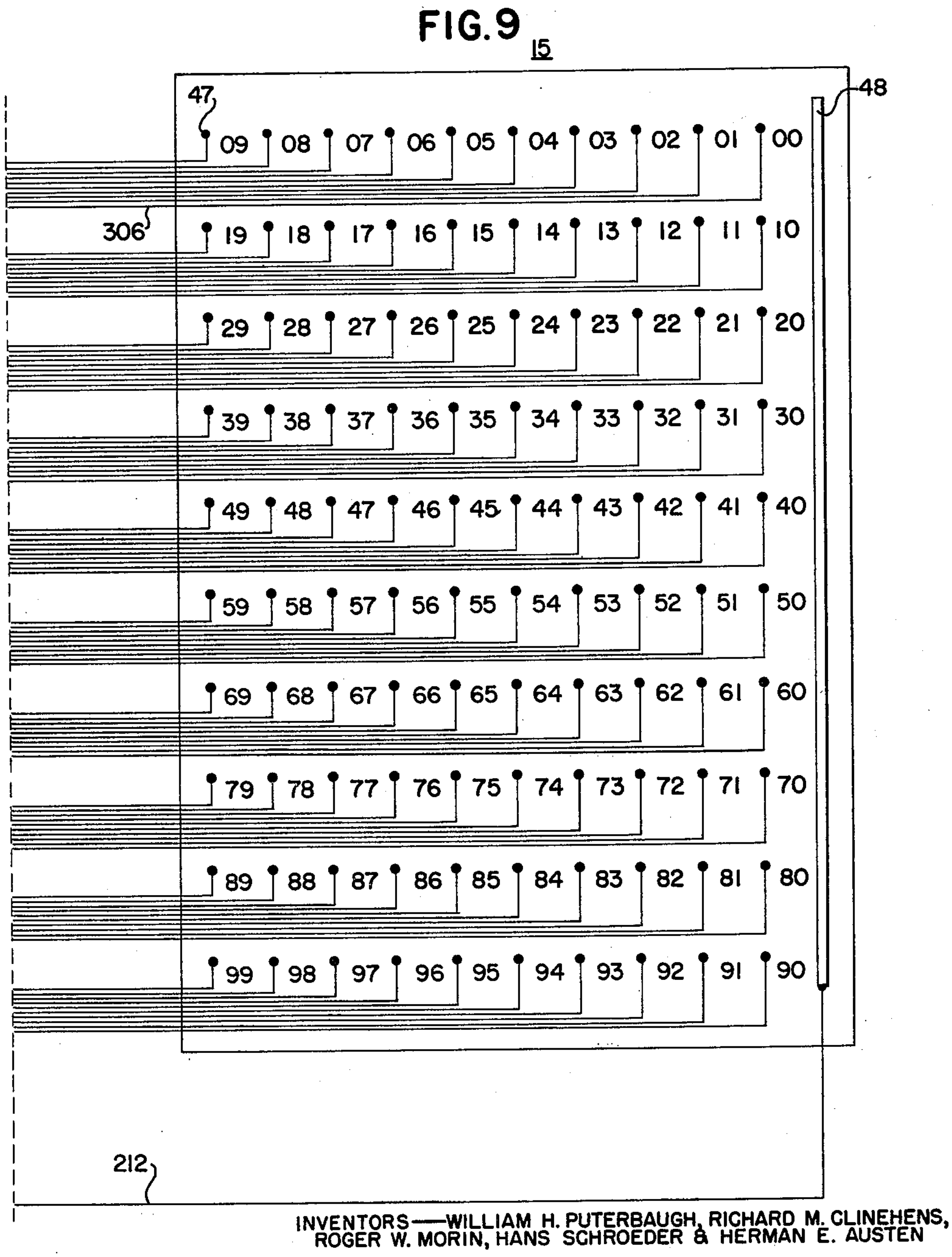

FIGS. 6 through 9 compose the electrical circuit diagram of the electrochemical data storage and counting system 10 of this invention. In order to accomplish a storing operation, the following group of circuits or components is utilized: a power supply unit 120 (FIG. 6), the pulse generator unit 121 (FIG. 6), keyboard switches 122 (FIG. 7), which comprise a units and a tens set 123 and 124, respectively, of switches (each set comprising ten switches), the selector or switch unit 16 (FIG. 8), and the electrochemical data storage device 15 (FIG. 9). In order to accomplish a manual ("read one") readout operation of a selected cathode electrode 47, the following group of circuits or components is utilized: the power supply unit 120 (FIG. 6), the units and tens sets, 123 and 124, respectively, of the keyboard switches 122 (FIG. 7), the selector unit 16 (FIG. 8), the electrochemical storage device 15 (FIG. 9), the constant current source circuit 125 (FIG. 6), the voltage comparator circuit 126 (FIG. 6), and the data indicating component 127 (FIG. 6). The data indicating component 127 comprises the timing motor 18, the chutch 19, and the counter and printer 20. In order to accomplish an automatic ("read all") readout operation of all the one hundred cathode electrodes 47, the same general circuits and components that are used in a manual readout operation are used, except that the keyboard switches 122 are replaced by the automatic stepping switches 128 and 129, found in the stepping switch circuitry 130 (FIG. 3). An example of a suitable stepping switch for the stepping switches 128 and 129 is the stepping switch, type 44 (SW–52–AJAC), supplied by Automatic Electric Company, Northlake, Illinois, United States of America.

The operating potential for the power supply unit 120 is obtained from any suitable 115-volt alternating current supply source and is applied by way of terminals 131 and 132 to the primary winding 133 of a transformer 134. The output of the transformer 134 is a 32-volt alternating current, which is developed across its secondary winding 135. The transformer 134 has a center tap at 136, which is connected to ground potential. The alternating current output of the transformer 134 is applied across the diodes 137 and 138 to provide full wave rectification thereof. A capacitor 139 is provided to filter the output of the diodes 137 and 138. The output of the diodes 137 and 138 is applied across a voltage dropping resistor 140 and two Zener diodes 141 and 142. The diodes 141 and 142 provide a reference voltage of approximately −13.5 volts, which is applied to the base of the PNP type transistor 143. The transistor 143 is operated as an emitter follower, and the voltage drop across its load resistor 144 is essentially equal to the −13.5 volts reference voltage appearing across the diodes 141 and 142. The PNP transistor 145 is also operated as an emitter follower, and it provides additional power gain for the control of the output voltage that appears across its load resistor 146. This output voltage is equal to approximately −12.5 volts, and it is maintained constant, regardless of load demands, until excessive load current causes the reference voltage to decrease. As long as the reference voltage is maintained, the emitter follower action of the transistors 143 and 145 maintains a constant output voltage of −12.5 volts. A capacitor 147 is connected between the emitter electrode of the transistor 145 and ground potential and serves to eliminate noise transients. The output of the power supply 120 is used by the magnetic clutch 19, the pulse generator unit 121, and the voltage comparator circuit 126. The output of the power supply 120 is switched from the pulse generator unit 121 to the magnetic clutch 19 and the circuits for the relays 148 and 149, in the voltage comparator circuit 126, by means of a switch 150, which is controlled by the read key 37 (FIG. 1). The voltage output of the power supply 120 is maintained on the other circuits of the voltage comparator circuit 126 at all times to eliminate switching noise interference.

The pulse generator unit 121 includes a conventional one-shot multivibrator circuit 168, comprising the PNP transistors 151 and 152. The output of the multivibrator circuit is modified by circuits comprising the NPN transistor 153 and the PNP transistor 154. The multivibrator circuit 168 provides a pulse of predetermined time duration when one unit of data is to be accounted for during a storing operation. The circuit comprising the transistors 153 and 154 provides a predetermined amplitude for the output pulse of the pulse generator 121. Thus, when one unit of data is desired to be accounted for during a storing operation, the output of the pulse generator 121 causes a plating current pulse having a substantially fixed current-time integral to flow between the anode electrode 48 and a selected cathode electrode 47. When more than one unit of data is desired to be accounted for during a storing operation, the operation of the generator unit 121 is modified by the circuit shown in FIG. 14 to cause a plating current pulse, having a current-time integral which is a multiple of the current-time integral of the plating current pulse used when one unit of data is desired to be accounted for in a storing operation, to flow between the anode electrode 48 and the cathode electrode 47. The current-time integral of the plating current pulse will be determined by the number of units of data which it is desired to account for in a single storing operation.

The mode of operation of the pulse generator unit 121 is as follows. In its stable condition, the transistor 152 is conductive, as a negative unidirectional bias potential is maintained on its base via the resistor 156 and the line 155 from the power supply unit 120, while its emitter is returned via the resistor 157 to ground potential. With the transistor 152 conductive, the base of the transistor 151 is maintained positive with respect to the negative potential at its emitter, by way of the connection including the resistor 158 between the collector of the transistor 152 and the base of the transistor 151. Thus, the transistor 151 is normally non-conductive.

The transistors 153 and 154 are normally non-conductive when the pulse generator unit 121 is in its stable condition. The transistor 153 is non-conductive, as its base is maintained negative with respect to its emitter via the resistors 159 and 118 and the lead 155 from the power supply. The transistor 154 is non-conductive, as its base is substantially at zero potential with respect to its emitter by way of the connection including the resistor 160, which is connected to ground potential.

The pulse generator unit 121 is triggered to its unstable condition by the closing of the normally open switch 161. The closing of the switch 161 causes one side of the capacitor 162 to be coupled to ground potential through the coupling capacitor 163. This causes the potential on the base of the transistor 152 to rise toward ground potential, which serves to render the transistor 152 non-conductive.

When the transistor 152 is rendered non-conductive, the potential of its collector drops, and, as a result, a negative potential is applied to the base of the transistor 151 via the resistor 158, causing that transistor to conduct. When the transistor 151 is rendered conductive, a more positive potential appears on its collector, and this positive potential is transferred via resistor 159 to the base of the transistor 153, causing it to conduct. When the transistor 153 becomes conductive, the potential of its collector decreases, and this potential decrease is applied to the base of the transistor 154, causing it to conduct. When the transistor 154 becomes conductive, the potential of its emitter decreases, and a negative output signal is taken from across emitter load resistor 164.

Since the charge on the capacitor 162 cannot change instantly when the transistor 151 is rendered conductive in response to the transistor 152 being rendered non-conductive, the base of the transistor 152 is driven to some positive potential to maintain the transistor 152 non-conductive even though the switch 161 is opened. After a predetermined time delay, determined primarily by the value of the time constant circuit including the capacitor 162 and the resistor 156, a negative potential again will appear on the base of the transistor 152 to render it conductive. When the transistor 152 is rendered conductive, the base of the transistor 151 is driven positive and maintained essentially at ground potential by the resistor 158 to cause the transistor 151 to be non-conductive and thus terminate the negative output signal of the pulse generator unit 121.

A diode 165 is connected between the emitter and the base of the transistor 151 to prevent an excess-voltage potential from appearing between the emitter and the base of the transistor 154.

The transistor 154 is used to shift the reference level of the output signal of the pulse generator unit 121 to zero. The output signal of the pulse generator unit 121 is applied via the switch 304 to the line 305 during a storing operation.

The constant current source circuit 125 (FIG. 6) includes a voltage divider comprising the resistors 190 and 191. The resistors 190 and 191 are connected across the output of the power supply unit 120 during a readout operation. The resistor 190 is provided with an adjustable output contact 192 to cause the correct current to be supplied to the storage device 15 during any readout operation.

The voltage comparator circuit 126 includes a one-shot multivibrator circuit 195, which comprises the PNP transistors 196 and 197. The circuit 195 has an input circuit, which comprises the PNP transistor 198 and the NPN transistor 199, and an output circuit, which comprises the NPN transistor 200, the PNP transistors 201 and 202, and the relays 148 and 149.

The transistor 198 has its emitter biased negatively via a resistor 203, so that it is prevented from becoming conductive until the signal voltage applied to its base, via the resistor 204 and via either the read all switch 205 or the read one switch 206, exceeds the level of the negative bias potential on its emitter. This signal voltage will exceed the level of the negative bias potential on the emitter of the transistor 198 when the material of the anode electrode 48 of the storage device 15 is completely deplated from the selected cathode electrode 47. The transistor 199 also has its emitter biased via resistor 207, which is connected between the emitter and ground potential. Thus, both of the transistors 198 and 199 will be non-conductive in the absence of a certain level signal voltage being applied to the base of the transistor 198. The transistor 199 provides a power gain and a voltage reference level shift of the signal voltage applied to the base of the transistor 198. When both of the transistors 198 and 199 are conductive, the negative potential appearing on the collector of the transistor 199 is applied to the base of the transistor 196 to trigger the one-shot multivibrator circuit 195 to its unstable condition.

The one-shot multivibrator circuit 195 operates in the same manner as the one-shot multivibrator circuit which comprises the transistors 151 and 152. The transistor 200, normally on-conductive, is rendered conductive by the positive potential appearing on the collector of the transistor 196 when this latter transistor is rendered con-conductive. This positive potential is applied via a resistor 208 to the base of the transistor 200. With the transistor 200 conductive, a negative potential appears on its collector and is applied to the bases of the transistors 201 and 202, causing those transistors to conduct. When the transistors 201 and 202 are conductive, energizing current will flow through their respective relays 148 and 149. The relay 148 is used to step the stepping switch 128 (FIG. 7) during the read all operation and is energized during the time that the one-shot multivibrator circuit 195 is in its unstable condition. The energization of the relay 148 causes a switch 209 (FIG. 7) to be closed to cause the stepping switch 128 to step in a manner which will be made clear when the read all operation is explained hereinafter. The relay 149 will remain energized until the counter and printer 20 has completed its indication of a readout operation of a particular cathode electrode 47 in the storage device 15. Energizing current for the relay 149 is supplied, during a readout operation, from the power supply unit 120 via switch 210, which is closed at this time. When the relay 149 is energized, it causes the switch 211 in the constant current source circuit 125 to be opened, thereby causing the readout current line 212, which extends to the anode electrode 48 in the storage device 15, to be opened. When the relay 149 is energized, it causes a switch 213, also in the constant current source circuit 125, to open, causing deenergization of the magnetic clutch 19. The energization of the relay 149 also causes the closing of a switch 214, in the data indicating component 127, to thereby initiate the operation of the printer in the counter and printer 20. The printer will then print the data obtained from the readout operation onto the paper 21. The energization of the relay 149 also causes the switch 215 to be closed, effecting energization of the key release solenoid 216 (FIG. 6). The key release solenoid 216, upon energization, causes the read-one key 38 (FIG. 1) to be released from its depressed condition in a manner more fully described hereinafter. When the printer of the counter and printer 20 has completed its printing cycle and the data read out from a cathode electrode 47 is printed on the paper 21, the relay 149 is deenergized, and the voltage comparator circuit 126 is ready for a subsequent readout operation of the storage device 15.

The timing motor 18, the clutch 19, and the counter and printer 20 are operative only during a readout operation of the storage device 15. The timing motor 18 is operated when the read key 37 (FIG. 1) is rotated. Energizing current for the timing motor 18 is supplied from the primary winding 133 of the transformer 134 by way of the lines 217 and 218. The switch 219 is closed when the read key 37 is rotated. The magnetic clutch 19 couples the timing motor 18 to the counter and printer 20, and it is energized when the switch 150 is transferred and either the read-one key 38 or the read-all key 39 (FIG. 1) is depressed. A depression of the read-one key 38 causes the switch 220 to be closed to supply operating potential from the power supply unit 120 to the clutch 19, while a depression of the read all key 39 causes the switch 221 to be closed to supply this operating potential.

When the clutch 19 is engaged with the counter and printer 20, the counter commences to count the time it takes to deplate the material of the anode electrode 48 from a selected cathode electrode 47 of the storage device 15. The operation of the counter will end when the relays 148 and 149 in the voltage comparator circuit 126 are energized. The relay 149 will then cause the printer motor 25 (FIG. 1) to be started, and the magnetic clutch 19 will be deenergized. After the printer motor 25 is started, a cam (not shown) on the motor drive shaft 28 (FIG. 1) is actuated, causing the switches 210 and 222 to close. With the switch 210 closed, the relay 149 is maintained in an energized state, causing other circuits to be disabled in the manner described previously. When the switch 222 is closed, energizing current for the printer motor 25 is maintained. The printer of the counter and printer 20 will print the digits indicated by the counter, and then the counter and printer 20 is automatically reset to zero. At the end of the cycle of the printer, the cam (not shown) on the motor drive shaft 28 (FIG. 1) will open the switches 210 and 222, and the system is ready to repeat another storing or readout operation.

The stepping switches 128 and 129 (FIG. 7) are operative only during a read-all operation of the system 10. Their manner of operation will be described hereinafter when a read-all operation is described in detail.

As previously set forth, the present invention provides an electrochemical data storage and counting system which may include a cash register or other accounting machine. The cash register chosen to illustrate the present invention is similar to the machine which is fully disclosed in United States Patent No. 2,443,652, issued June 22, 1948, to Edward J. Carey and John B. Geers. Mechanism pertinent to the present invention will be fully described in the ensuing pages.

Referring now to FIG. 10, the cash register 230 is provided with a drawer cabinet 231, which supports a cash drawer 232, and said drawer cabinet is secured to a wood base 233. The mechanism of the cash register is enclosed in a suitable cabinet 234.

The keyboard of the cash register 230 comprises four rows of amount keys 235, giving a maximum registering capacity of $99.99; and one row of transaction keys 236, for controlling the positioning of a corresponding printing wheel to record the type of transaction being performed and also for controlling the functioning of the single totalizer with which the machine is equipped. The keyboard also comprises a row of column-selecting keys 237, for selectively controlling the shifting of the four amount type wheels corresponding to the four rows of amount keys 235, to cause various items to be printed in corresponding columns of the record material; a space key 238, for manually line-spacing the record material; a key release lever 239, for manually releasing any of the keys when the cash register is at rest; a motor bar 240 (FIG. 12), for initiating machine operation, the finger-piece 241 of which projects through an opening in the keyboard top plate and is conveniently located on the right-hand side of the keyboard; the base lock key 242, for unlocking the cash register proper from the cash drawer base or cabinet; and the control slide 243, for controlling the functions of the cash register. The indicator wheels 244, for the amount banks, and the indicators 245, for the transaction keys 236, are visible through a glass-covered aperture 229 in the front of the cabinet 234.

In accordance with the present invention, the cash register 230 is provided with two rows of classification keys 246 and 247 for allowing an operator to control the operation of the selector unit 16, so that a particular cathode electrode 47 may be selected concerning which a recording or storing operation is to be performed. Each row of classification keys 246 and 247 comprises nine keys.

Inasmuch as the key mechanism are duplicated for each row of classification keys, it is believed that a description of the row of classification keys 246, shown in FIG. 11, will suffice for the other row of keys, 247. The keys 246 are depressibly supported in slots in plates 248 and 249 and are retained against removal by means of slots therein in cooperation with the corresponding ones of the rods 250. Each of the classification keys 246 is normally retained in undepressed position by a coil spring 251, which extends horizontally through the entire keyboard assembly, there being one such spring for all keys of like numerical order, said springs adapted to be engaged by notches in the keys of the like orders. The springs 251 rest on the top surface of the keyboard plate 248, and, when a key is depressed, said spring is forced or tensioned downwardly through an opening in said plate adjacent the key stem 252, and, when said key is releaesd, the spring 251 returns it upwardly to undepressed position, as shown in FIG. 11.

Each of the rows of classification keys has a detent 253, for locking the keys in depressed position, and a control plate 254, for opening the switch 255 when any of the classification keys are depressed. The switch 255 may be conveniently attached to an auxiliary frame (not shown) secured to the main side frames of the cash register.

The keyboard framework including the classification keys 246 and 247 comprises front and back frames 256 and 257, a partition plate 258 for each row of keys, the upper support plate 248, and the lower support plate 249. All of the above plates are secured together by means of small tie rods 259, which pass through holes in the partition plates 258. The keyboard assembly is retained in place on the cash register by means of four screws, such as 260, which pass through clearance holes in bent-over ears on the front and back frames 256 and 257 and are threaded into holes in the main frames of the cash register.

A keyboard top plate 261 is provided for covering the keyboard framework. It has therein clearance openings for clearing the tips of all the keys of the keyboard.

There is supported on the upper support plate 248 a panel 265, of insulating material, which carries a conductive strip 267 and nine movable contacts 268. The strip 267 and the contacts 268 correspond to the "1" through "9" switches of the units set 123 of keyboard switches shown in the electrical circuit diagram of FIG. 7. When all of the keys 246 are in their undepressed position, as shown in FIG. 11, only the zero switch 255 will be closed. The zero switch 255 corresponds to the "0" switch of the units set 123 of keyboard switches (FIG. 7).

Depression of any one of the classification keys 246 or 247 causes an angular camming surface on a projection 270 thereof, in cooperation with the forward edge of a corresponding slot in the detent 253, to shift said detent forwardly, against the action of a spring 271, until said projection passes beneath said detent, whereupon the spring 271 returns said detent rearwardly to lock the depressed key in depressed position. When a classification key 246 or 247 is in its depressed position, the under side 272 of its tip or finger piece will urge the movable contact 268 into contact with the conductive strip 267. The control plate 254 lies directly beneath the detent 253, and depression of any one of the classification keys 246 causes the camming surface of the projection 270 thereon, in cooperation with the edge of a corresponding slot in the plate 254, to shift said plate forwardly and retain said plate in its forward position while said key is depressed. When the plate 254 is shifted forwardly, its end 273 will open the switch 255.

Referring now to FIG. 12, the cash register 230 is provided with a motor release or starting bar 240, which is slidably mounted, by means of parallel slots therein in cooperation wtih studs 274, fast in the frame of the register, and said bar is normally maintained in its upward, or undepressed, position by a spring 275. Three normally open motor-bar-controlled switches 276, 277, and 278 are secured to the right frame 279 of the cash register 230. When the motor bar 240 is depressed, the under side 280 of the finger piece 241 contacts the switch 276, causing that switch and the other switches 277 and 278 to be closed. The switch 276 is located in the constant current source circuit 125 (FIG. 6), while the switches 277 and 278 are located in the stepping switch circuitry 130 (FIG. 7). The purpose and function of the switches 276, 277, and 278 will be readily apparent when the storing and readout operations of the recording and counting system 10 are described in detail hereinafter.

It is not desired to commence a storing operation of the recording and counting system 10 until the selector or switch unit has been operated to select the desired cathode electrode 47 upon which to perform a storing operation. Thus, the switch 161 (FIGS. 6 and 13) is provided for delaying the operation or triggering of the pulse generator unit 121 (FIG. 6) until the selector unit 16 has been operated. In FIG. 13, the switch 161 is shown attached to an auxiliary frame 287 of the cash register 230 by means of an arm 281. A link 282 is provided with a projection 283, which is adapted to close the switch 161 when the link 282 is moved upwardly. The amount indicator wheels 244 are positioned under control of their associated differential mechanism. A pinion 284 for the indicator wheel 244 (shown in FIG. 13) has, cooperating with its teeth, an aligner pawl (not shown) secured on a shaft 285, journaled in bushings in the frames of the cash register. Secured on the end of the shaft 285 is a crank 286, which is connected by the link 282 and other mechanism (not shown) to an arm which carries a roller which cooperates with a cam groove in one face of a box cam secured on the main shaft of the cash register 230. The mechanism described above is not shown in FIG. 13, but it is shown in detail in FIGS. 44A, 44B, 45 and 46 of United States Patent No. 2,443,652, previously referred to. Also, in FIG. 52 of that patent, there is given the timing of the cam groove, from which it is seen that said groove, through the mechanism shown in FIGS. 45 and 46 of that patent, disengages the aligner pawl from the teeth of the pinion 284 a short time after the beginning of the operation of the cash register. The disengagement of this aligner pawl is effected when the link 282 is moved upwardly. Consequently, it is at this time, shortly after the beginning of the operation of the cash register 230, that the switch 161 is closed.

Further, in accordance with the present invention, the cash register 230 is provided at the left-hand side of its keyboard with a row of multiple-unit keys 290 (FIG. 10). Upon depression of a repeat key 290, certain switches in a switching network 291 (FIG. 14), to be described hereinafter, are closed to complete a circuit for effecting a recording operation in which two to twelve units of data may be accounted for during a single cycle of operation of the cash register 230. The number of units of data accounted for during a single cycle of operation of the cash register 230 is determined by the particular multiple-unit key depressed. Thus, if an operator should sell a dozen items of the same merchandise, then, upon depression of the "12" multiple-unit key 290, the amount of the material of the anode electrode 48 which would be plated on a selected cathode electrode 47 would represent those dozen items.

The storing or writing operation of the data storage and counting system 10 will now be described with reference to FIGS. 6, 7, 8 and 9.

As previously set forth, the following group of components is utilized in a storing or writing operation: the power supply unit 120 (FIG. 6), the pulse generator unit 121 (FIG. 6), the units and tens sets 123 and 124, respectively, of keyboard switches 122 (FIG. 7), the selector or switch unit 16 (FIG. 8), and the electrochemical storage device 15 (FIG. 9).

Let us suppose that an item of merchandise is sold through the cash register 230. The amount keys 235 appropriate to the price of this item of merchandise are depressed. Let us now suppose that this item of merchandise is so classified that data concerning its sale is to be recorded on the "00" cathode electrode 47 (FIG. 9) of the storage device 15.

The power supply unit 120 supplies direct-current power to the pulse generator unit 121 via the switch 150 and the line 155. None of the classification keys 246 or 247 will be depressed, since, in this example, the merchandise to be sold bears the classification "00." Instead, the switches 255 (FIGS. 7 and 11) will be closed, and these switches will control the operation of the selector unit 16 so that the "00" cathode electrode 47 is utilized for the storage of data thereon.

The motor bar 240 (FIG. 12) of the cash register 230 is then depressed, and the cash register commences a normal entry cycle. Upon depression of the motor bar 240, the motor bar switches 276 (FIGS. 6 and 12), 277 (FIGS. 7 and 12), and 278 (FIGS. 7 and 12) are closed. The alternating current power from the primary winding 133 of the transformer 134 is supplied via a line 300, which includes the closed motor bar switch 277 and the closed zero keyboard switch 255 in the units set of keyboard switches 122, to the "0" solenoid 99 in the selector unit 16. This alternating current power is also supplied via the line 300 through the closed motor bar switch 278 to the closed zero keyboard switch 255, in the tens set of keyboard switches 122, and then is supplied via the line 301 to the "00" solenoid 83 in the selector unit 16.

The switching beam 78 associated with the "00" solenoid 83 will be moved to the left (as viewed in FIG. 8), and the switching beam 95 associated with the "0" solenoid will be moved downwardly (as viewed in FIG. 8) upon energization of these solenoids. Consequently, only the flexible contact 72 (at 302) (FIG. 8) will contact its associated stationary contact 113.

When the motor bar 240 is depressed, the anode electrode 48 in the storage device 15 is coupled to ground potential via the line 212, an adjustable current control resistor 303, and the closed motor bar switch 276.

After the predetermined delay, which is controlled by the cash register 230, the projection 283 (FIG. 13) on the link 282 will move upwardly, and the delay switch 161 (FIG. 6) will be closed. Upon the closing of the delay switch 161, the pulse generator unit 121 will be triggered to its unstable condition. The output of the pulse generator unit 121 is applied through the switch 304 via the line 305 to the closed contacts 72 and 113 (at 302, FIG. 8) of the selector unit 16. From these closed contacts of the selector unit 16, the output of the pulse generator unit 121 is applied via a line 306 to the "00" cathode electrode 47 of the storage device 15. Consequently, the output of the pulse generator unit 121, which is a negative voltage pulse, is applied across the selected cathode electrode 47 and the anode electrode 48. The anode electrode 48 is connected to ground potential through the current control resistor 303 and the motor bar switch 276. Consequently, a plating current pulse for the unit of data to be accounted for is caused to flow between the anode electrode 48 and the "00" cathode electrode 47. This plating current pulse has a substantially fixed current-time integral whereby a predetermined amount of the material of the anode electrode 48 is plated on the selected cathode electrode 47. This amount of the material of the anode electrode 48 plated on the selected cathode electrode 47 represents one unit of merchandise or one unit of data.

The writing or storing operation described above is effected each time a unit of merchandise is sold through the cash register 230. For instance, if a different unit of merchandise is sold and data concerning this sale is to be recorded on the "19" cathode electrode 47 of the storage device 15, then the "1" classification key 247 and the "9" classification key 248 on the cash register 230 would be depressed, causing the "0" switches 255 to be opened. Then, upon depression of the motor bar 240, the "9" solenoid 99 and the "10" solenoid 83 of the selector unit 16 will be energized. As a result, the contacts 72 and 113 (at 307, FIG. 8) of the selector unit 16 will close, completing the writing or storing circuit for the "19" cathode electrode 47 in the storage device 15.

When more than one unit of merchandise of the same kind or classification is sold through the cash register 230 during a single sales transaction, it is advantageous to utilize one cash register cycle to record the cost of the merchandise and also to plate on the selected cathode electrode 47 an amount of the material of the anode electrode 48 which will represent the number of units of merchandise sold. For instance, if twelve units of the same kind of merchandise were sold, then it is desirable to plate automatically an amount of the material of the anode electrode 48 on the cathode electrode 47 representative of the twelve units of merchandise sold.

In accordance with the present invention, the cash register 230 is provided with the row of multiple-unit keys 290 (FIGS. 10 and 14), which are labeled 2 through 12, inclusive. These multiple-unit keys 290 are adapted to actuate switches in the switching network 291 (FIG. 14). The switching network 291 comprises the switches 310 to 327, inclusive, the capacitors 328 to 331, inclusive, and the resistors 332 to 335, inclusive. One side of all of the capacitors 328 to 331, inclusive, is connected via a line 336 to the point 337 in the pulse generator unit 121 (FIG. 6). The other side of the capacitor 328 is connected to the switch 313 and to the switch 322. The other side of the capacitor 329 is connected to the switch 312, to the switch 318, to the switch 324, and to the switch 326. The other side of the capacitor 330 is connected to the switch 311, to the switch 314, to the switch 316, and to the switch 320. Finally, the other side of the capacitor 331 is connected to the switch 310. A line 338 interconnects the point 339 in the pulse generator unit 121 (FIG. 6) and the switches 310 to 314, inclusive, and the switches 316, 318, 320, 322, 324, and 326. One side of all of the resistors 332 to 335, inclusive, is connected via a line 340 to a point 341 in the constant current source circuit 125 (FIG. 6). The other side of the resistor 332 is connected to the switches 315, 319, and 323. The other side of the resistor 333 is connected to the switches 321 and 327. The other side of the resistor 334 is connected to the switch 317. Finally, the other side of the resistor 335 is connected to the switch 325. A line 342 interconnects the point 343 in the voltage comparator circuit 126 (FIG. 6) and the switches 315, 317, 319, 321, 323, 325, and 327.

The operation of the switching network 291 will now be described.

Let us suppose that two units of the same kind of merchandise were sold and it is desired to plate automatically an amount of the material of the anode electrode 48 on a cathode electrode 47 corresponding to the classification of the merchandise sold. The "2" multiple-unit key 290 will be depressed, causing the switch 310 to be closed. With the switch 310 closed, the capacitor 331 is connected in parallel with the capactor 162 in the pulse generator unit 121 (FIG. 6). The value of the capacitor 331 is such that, when it is inserted into the time constant circuit of the one-shot multivibrator circuit 168, it causes this time constant circuit to be doubled in value. As a result, a plating current pulse, having a current-time integral which is substantially equal to twice the current-time integral of the plating current pulse utilized when a single unit of data is to be accounted for in a single cash register cycle, is caused to flow between the anode electrode 48 and a selected cathode electrode 47. Thus, an amount of the material of the anode electrode 48, representative of two units of data, will be plated on a selected cathode electrode 47.

Let us suppose that twelve units of the same kind of merchandise were sold and it is desired to plate automatically an amount of the material of the anode electrode 48 on a cathode electrode 47 representative of the twelve units of merchandise sold.

The "12" multiple-unit key 290 will be depressed, causing the switches 326 and 327 to be closed. With the switch 326 closed, the capacitor 329 is connected in parallel with the capacitor 162 in the pulse generator unit 121. See FIG. 6. The value of the capacitor 329 is such that, when it is inserted into the time constant circuit of the one-shot multivibrator circuit 168, it causes this time constant circuit to be inceased by a factor of four. With the switch 327 closed, the resistor 333 is connected in parallel with the resistor 303 in the constant current source circuit 125 (FIG. 6). The value of the resistance between the points 341 and 343 will be redued by a factor of three. As a result, a plating current pulse, having a current-time integral which is substantially equal to twelve times the current-time integral of the plating current pulse utilized when a single unit of data is to be accounted for in a single cash register cycle, is caused to flow between the anode electrode 48 and a selected cathode electrode 47. Thus, an amount of the material of the anode electrode 48 representative of twelve units of data will be plated on a selected cathode electrode 47.

The manual readout operation of the data storage and counting system 10 will now be described.

As previously set forth herein, in a manual readout operation, the following groups of components is utilized: the power supply unit 120 (FIG. 6), the units and tens sets 123 and 124, respectively, of the keyboard switches 122 (FIG. 7), the selector or switch unit 16 (FIG. 8), the electrochemical storage device 15 (FIG. 9), the constant current source circuit 125 (FIG. 6), and the data indicating component 127 (FIG. 6).

Let us suppose that the "00" cathode electrode 47 of the storage device 15, during prior storing or recording operations of the data storage and counting system 10, had an amount of the material of the anode electrode 48 plated thereon which represents six units of data of a certain classification. It is now desired to read out this data from the "00" cathode electrode 47.

The operator first turns the read key 37 (FIG. 1). This actuation of the read key 37 causes the switch 150 in the power supply unit 120 to transfer, thereby connecting the direct current output of said unit to one side of the resistor 191, to the closed switch 213, to the emitter of the transistor 200 via a resistor 345, to the collectors of the transistors 201 and 202, and to one contact of the open switch 210. This actuation of the read key 37 also causes the switch 304 (FIG. 6) to transfer, the switches 346, 347, and 348 (FIG. 7) to be closed, and the switches 349 and 350 (FIG. 7) to be opened. With the switches 346 and 347 closed, alternating current power from the primary winding 133 of the transformer 134 is supplied via the line 300, which includes the closed switches 351 and 346 (FIG. 7), and the closed zero keyboard switch 255 in the uits set 123 of keyboard switches 122 to the "0" solenoid 99 in the selector unit 16. This alternating current power is also supplied via the line 300 through the closed switches 352 and 347 (FIG. 7) and the closed zero keyboard switch 255 in the tens set 124 of keyboard switches 122, and then via the line 301 to the "0" solenoid 83 in the selector unit 16.

The switching beam 78 associated with the "0" solenoid 83 will be moved to the left (as viewed in FIG. 8), and the switching beam 95 associated with the "0" solenoid 99 will be moved downwardly (as viewed in FIG. 8) upon energization of these solenoids. Consequently, only the flexible contact 72 (at 302, FIG. 8) will contact its associated stationary contact 113. As a result, the "00" cathode electrode 47 of the storage device 15 will be connected to ground potential via the line 306, the switch at 302 (FIG. 8), the line 305, and the transferred switch 304.

The turning of the read key 37 also causes the switch 219 (FIG. 6) to be closed, thereby starting the timing motor 18 by applying alternating current power thereto.

The read-one key 38 (FIG. 1) is then depressed, causing the switches 206, 220, 353, and 354 (FIG. 6) to be closed. With the switch 353 closed, the output of the power supply unit 120 is applied by way of the resistors 191 and 190, the closed switch 211, the closed switch 353, the resistor 303, and the line 212 to the anode electrode 48 in the storage device 15. With the switch 206 closed, the input of the voltage comparator circuit 126 is connected to the anode electrode 48 in the storage device 15 via the line 212. With the switch 220 closed, energizing current is supplied to the clutch 19, thereby causing the timing motor 18 to drive the counter in the counter and printer 20.

The counter in the counter and printer 20 then operates to account for the time that is required to remove the plated material of the anode electrode 48 from the "00" cathode electrode 47 of the storage device 15. When all the plated material is removed from this "00" cathode electrode 47, a change in voltage will be developed in the deplating circuit. As previously pointed out, this change in voltage occurs due to the change of electrode potential from that of the material of the anode electrode 48 to that of the cathode electrode 47. This change in voltage in the deplating circuit is then detected by the voltage comparator circuit 126. The voltage change is applied via the closed switch 206 and the resistor 204 to the base of the transistor 198 to cause it to become conductive. When the transistor 198 becomes conductive, the transistor 199 also is made conductive. The output of the transistor 199 is used to trigger the one-shot multivibrator 195 into its unstable state, wherein the transistor 196 is conductive and the transistor 197 is non-conductive. The output of the one-shot multivibrator 195, when it is in its unstable state, is applied to the transistor 200 to make that transistor conductive. When the transistor 200 is made conductive, its output causes both of the transistors 201 and 202 to become conductive, and, when the transistors 201 and 202 become conductive, the relays 148 and 149 are energized.

Upon the energization of the relay 149, the printer in the counter and printer 20 is started. The relay 149 closes the switch 214 (FIG. 6) to supply operating current to the printer. The relay 149 also causes the switch 213 to be opened, thereby deenergizing the clutch 19. Further, the relay 149 opens the switch 211 (FIG. 6) to disconnect the output of the power supply unit 120 from the anode electrode 48 of the storage device 15, and, finally, the relay 149 causes the switch 215 (FIG. 6) to be closed, thereby causing the key release solenoid 216 to be energized. The energization of the key release solenoid 216 causes the read-one key 38 (FIG. 1) to be automatically raised from its depressed position.

The printer in the counter and printer 20 will then print on the paper 21 the number of units of data that was represented by the amount of the material of the anode electrode 48 plated on the "00" cathode electrode 47 of the storage device 15. At the same time, the count indicator 24 (FIG. 1) of the counter will indicate the same number. In the example chosen for illustrative purposes, the number "6" will be printed on the paper 21 and also will be shown on the count indicator 24. Then the counter and printer 20 will be reset to zero in the manner previously described.

The automatic readout operation of the data storage and counting system 10 will now be described.

As previously described herein, in an automatic readout operation, the same general circuits and components that are used in a manual readout operation are used except that the keyboard switches 122 are replaced by the automatic stepping switches 128 and 129 found in the stepping switch circuitry 130 (FIG. 7). The automatic readout operation includes multiple readout operations in which all of the one hundred cathode electrodes 47 of the storage device 15 are read out.

First, the operator turns the read key 37 (FIG. 1), and, as in the manual readout operation, the switches 150 and 304 are transferred, the switches 219 (FIG. 6), 346, 347, and 348 (FIG. 7) are closed, and the switches 349 and 350 (FIG. 7) are opened. Then, the read-all key 39 is depressed, which causes the switches 205, 221, 358 (FIG. 6), 359, 360, and 361 (FIG. 7) to be closed, and the switches 351 and 352 (FIG. 7) to be opened.

With the switch 359 FIG. 7) closed, alternating current power from the primary winding 133 of the transformer 134 is supplied via the line 300 and the switch 359, through level A of the stepping switch 128, and via the line 300 to the "0" solenoid 99 in the selector unit 16, and, with the switch 360 closed, alternating current power from the primary winding 133 of the transformer 134 is supplied via the line 300 and the switch 360, through level A of the stepping switch 129, and via the line 301 to the "00" solenoid 83 in the selector unit 16. The switching beam 78 associated with the "00" solenoid 83 will be moved to the left (as viewed in FIG. 8), and the switching beam 95 associated with the "0" solenoid 99 will be moved downward (as viewed in FIG. 8), upon energization of these solenoids. Consequently, only the flexible contact 72 (at 302, FIG. 8) will contact its associated stationary contact 113. As a result, the "00" cathode electrode 47 will be connected to ground potential for the readout of the data plated thereon.

Just as it occurs in a manual readout operation, the turning of the read key 37 also causes the switch 219 (FIG. 6) to close, thereby starting the timing motor 18.

The "00" cathode electrode 47 in the storage device 15 is then read out in the same manner as it done during a manual readout operation. When the voltage comparator circuit 126 detects the time when all the material of the anode electrode 48 is removed from the "00" cathode electrode 47, the relays 148 and 149 are energized.

The energization of the relay 149 causes the printer in the counter and printer 20 to be started, and it causes the deenergization of the clutch 19 and the disconnection of the constant current generator circuit 125 from the anode electrode 48 in the storage device 15.

The energization of the relay 148 causes the switch 209 (FIG. 7) to be closed. The switch 348 being closed, alternating current from the primary winding 133 of the transformer 134 is supplied via the lines 300 and 355 to the rectifier circuits 362 and 363 associated with the stepping switches 128 and 129, respectively. The rectifier circuits 362 and 363 each comprises a diode 364, a limiting resistor 365, and a capacitor 366. At this time, the output of the rectifier circuit 362 energizes the solenoid 367 by way of a circuit path including the closed switches 209 and 361. A resistor 368 and a capacitor 369 are connected in parallel with the solenoid 367, and this combination of elements serves as a noise suppressor. The energization of the solenoid 367 causes its plunger 370 to move to the left, as viewed in FIG. 7, thereby opening the *b* and *c* contacts of the switch 371 and closing its *a* and *b* contacts.

The relay 148 is deenergized when the transistor 201 is caused to be non-conductive. Consequently, the relay 148 is deenergized when the one-shot multivibrator circuit 195 in the voltage comparator circuit 126 returns to its stable condition. This event occurs after the voltage comparator circuit 126 has detected the change in voltage in the deplating circuit occurring when all the material of the anode electrode 48 has been removed from the "00" cathode electrode 47 in the storage device 15.

Upon the deenergization of the relay 148, the switch 209 is opened, causing the solenoid 367 to become deenergized. At this time, the plunger 370 will move to the right, causing the A, B, and C levels of the stepping switch 128 to rotate one position in a clockwise direction. The A and B levels of the stepping switch 128 will move to their "1" position. The plunger 370 is mechanically connected to the A, B, and C levels of the stepping switch 128, and this connection is represented by the dashed line 372 in FIG. 7.

At this time, the "00" solenoid 83 of the selector unit 16 will remain energized, but the "1" solenoid 99 of the selector unit 16 is now energized via line 300 from the primary winding 133 of the transformer 134, through the closed switch 359, through level A of the stepping switch 128, and then via line 373 to the "1" solenoid 99.

The "01" cathode electrode 47 of the storage device 15 is then read out. The "02" to "09" cathode electrodes 47 are read out in a similar manner. For example, the "09" cathode electrode 47 is read out after the energizing circuit for the "9" solenoid 99 of the selector unit 16 is completed through level A of the stepping switch 128. At this time, level A will be in its "9" position, and the energizing circuit for the "9" solenoid 99 will include the line 374.

After the readout of the "09" cathode electrode 47 of the storage device 15, the voltage comparator circuit 126 will detect the change in voltage occurring in the deplating circuit and cause the relays 148 and 149 to be energized. The energizing of the relay 148 will cause the switch 209 to close, thereby effecting the energization of the solenoid 367. Upon the deenergization of the relay 148, the switch 209 will open, and the solenoid 367 will be deenergized. At this time, the plunger 370 of the solenoid 367 will move to the right, causing the A, B, and C levels of the stepping switch 128 to rotate one position in a clockwise direction. The plunger 370 will also cause the *b* and *c* contacts of the switch 371 to close. The A, B, and C levels of the stepping switch 128 will move to their "10" position. At this time, the cam surface 375 on level C of the stepping switch 128 causes the contacts *a* and *b* of the switch 376 to open and the contacts *b* and *c* of this switch to close. As a result, a circuit is completed for energizing the solenoid 367 again. When the solenoid 367 is energized again, it causes the contacts *b* and *c* of the switch 371 to open, immediately causing its deenergization.

Upon the deenergization of the solenoid 367, its plunger 370 will cause the A, B, and C levels of the stepping switch 128 to rotate clockwise. The A, B, and C levels of the stepping switch 128 will move to their "0" position.

When level B of the stepping switch 128 was in its "10" position, a circuit was completed via lines 377 and 378 for energizing the solenoid 379 of the stepping switch 129. Then, when level B of the stepping switch 128 was rotated to its "0" position, the energizing circuit for the solenoid 379 was broken. The deenergization of the solenoid 379 at this time causes its plunger 380 to move to the right and rotate levels A, B, and C of the stepping switch 129 one position in a clockwise direction. The A, B, and C levels of the stepping switch 129 will therefore be rotated to their "1" position.

At this point, the "10" solenoid 83 of the selector unit 16 is energized via line 381 from this solenoid, through level A of the stepping switch 129, through the closed switch 360, and then via line 300 to the primary winding 133 of the transformer 134 in the power supply unit 120, and the "0" solenoid 99 of the selector unit 16 is energized via a portion of the line 300 extending from this solenoid, through level A of the stepping switch 128, through the closed switch 359, and then via another portion of the line 300 which is connected to the power supply unit 120.

The "10" cathode electrode 47 of the storage device 15 is now read out in the manner previously described.

The "11" to "99" cathode electrodes 47 are then selected and read out in the manner previously described. Thus, each time the levels A, B, and C of the stepping switch 128 advance to their "10" position, the levels A, B, and C of the stepping switch 129 will rotate one position clockwise under the control of the level B of the stepping switch 128. Then, the levels A, B, and C of the stepping switch 128 will be reset automatically to their "0" positions. This cycle will continue until the levels A, B, and C of the stepping switch 129 are rotated to their "10" positions. At this time, the level B of the stepping switch 129 will complete an energizing circuit, including the lines 382 and 383 and the closed switch 219, for the key release solenoid 216. The energization of this solenoid 216 will cause the release of the read-all key 39 (FIG. 1).

Finally, when the levels A, B, and C of the stepping switch 129 are rotated to their "10" positions, a cam surface 384, on the level C of this switch, will cause the contacts *b* and *c* of the switch 385 to close. Consequently, the energizing circuit for the solenoid 379 will be completed. The energization of the solenoid 379 will open the contacts *b* and *c* of the switch 386, causing deenergization of this solenoid. Upon deenergization of the solenoid 379, its plunger 380 will cause the levels A, B, and C of the stepping switch 129 to rotate to their "0" positions. Consequently, both of the stepping switches 128 and 129 are reset to their "0" positions after the "99" cathode electrode 47 of the storage device 15 is read out.

In the illustrative embodiment of the present invention, just described, the selector unit 16 comprises switching beams 78 and 95, which are actuated by the "00," "10," etc., solenoids 83 and the "0," "1," etc., solenoids, respectively. The energization of the "00," "10," etc., solenoids 83 is controlled by the tens set 124 of keyboard switches 122 during a storing or a manual readout operation, and by the stepping switch 129 during an automatic readout operation of all of the cathode electrodes 47 of the storage devices 15. The energization of the "0," "1," etc., solenoids 99 is controlled by the units set 123 of keyboard switches 122 during a storing or a manual readout operation, and by the stepping switch 128 during an automatic readout operation.

It is to be understood to be within the cope of the present invention to provide a selector unit somewhat modified from the selector unit 16 shown in FIGS. 4 and 5. For example, in place of the ten non-conductive switching beams 78, there may be provided ten stationary conductive beams or strips, each having therein ten apertures through which the flexible contacts 72 may pass. Through the total of one hundred apertures, one hundred flexible contacts 72 would pass (one contact 72 passing through each aperture). There would normally be no electrical contact between the contacts 72 and the stationary conductive strips. Each of the ten stationary conductive strips would be connected to an appropriate one of the tens set 124 of keyboard switches 122 and to an appropriate position of the A level of the stepping switch 129 (FIG. 7). Each of the ten non-conductive switching beams 95 would be connected to an appropriate one of the solenoids 99 in the manner previously described. Thus, each one of the one hundred contacts 72 would pass through an aperture provided in each of the beams 95 and conductive strips. On the circuit of FIG. 7, a line would be connected between the point 400 and the point 401, and that portion of the line 305 between the point 400 and the selector unit 16 (FIG. 8) would not be needed, and the line 402 between the point 401 and the point 403 would be removed from the circuit of FIG. 7. Consequently, the keys 247 (FIG. 10) of the cash register 230 may be utilized to actuate the keyboard switches 124 (FIG. 7) to thereby supply current to a selected one of the conductive strips in the selector unit 16, and the keys 246 (FIG. 10) may be utilized to actuate the keyboard switches 122 (FIG. 7) to supply energizing current to a selected one of the solenoids 99 in the selector unit 16. When a solenoid 99 is energized, it will cause its associated non-conductive switching beam 95 to move the flexible contact 72 into engagement with the conductive strip selected by the tens set of switches 124. Each of the flexible contacts 72 is connected to a specific cathode electrode 47 of the storage device 15, so that a storing operation may be effected relative to a selected electrode 47. In the readout operation, a selected cathode electrode 47 will be connected to ground potential through either the tens set 124 of keyboard switches 122 or the level A of the stepping switch 129, and via the switch 304 (FIG. 6).

In the illustrative embodiment of the invention, the storage device 15 comprises one hundred cathode electrodes 47. It is to be understood to be within the scope of the present invention to provide a storage device similar to the storage device 15 but having a greater number of cathode electrodes 47. For example, the storage device may comprise a thousand cathode electrodes 47. In this event, the selector unit may comprise ten selector unit subassemblies each similar to the selector unit 16 (FIG. 8). The first selector unit subassembly would contain cathode electrodes "00" to "99," the second selector unit subassembly would contain cathode electrodes "100" to "199," and so on. The tenth selector unit subassembly would contain cathode electrodes "900" to "999." The keys 247 (FIG. 1) of the cash register 230 would actuate the tens set 124 of keyboard switches 122 in the manner previously described, but, instead of each of those switches being connected only to a single solenoid 83 of the selector unit 16, each would be now connected to a single solenoid of each of the ten selector unit subassemblies, and the keys 246 (FIG. 10) of the cash register 230 would actuate the units set 123 of keyboard switches 122 in the manner previously described, and each of those switches would be now connected to a single solenoid 99 of each of the selector unit subassemblies. In addition, another row of control keys, similar to the control keys 246 and 247 (FIG. 1), would be provided to control the operation of the selector unit. This additional row of control keys would be provided for actuating a further set of keyboard switches similar to the units and tens sets of keyboard switches 122. This further set of keyboard switches would be electrically located so that the output of the pulse generator unit 121 (FIG. 6) would be supplied thereto, and these keyboard switches would be provided with ten output lines. Each of the ten output lines would, in turn, be connected to the input terminal (such as 73, FIG. 4) of each of the ten selector unit subassemblies. Consequently, this further set of keyboard switches would connect the output of the pulse generator unit 121 during a storing operation to an input terminal of only one of the selector unit subassemblies, and, during a readout operation, only the selected cathode electrode in a single selector unit subassembly would be connected to ground potential via the switch 304 (FIG. 6).

While the form of the data storage and counting system which is shown and described herein is admirably adapted to fulfill the objects primarily stated, it is to be understood that it is not intended to confine the invention to the form or embodiment disclosed herein, for it is susceptible of embodiment in various other forms, all coming within the scope and intent of the invention.

What is claimed is:

1. An electrochemical data storage and counting system for accounting for units of data of different classifications comprising: a storage device comprising a plurality of cathode electrodes of one material, an anode electrode of another material, and an electroplating bath for said electrodes, each of said plurality of cathode electrodes being capable of having stored thereon an amount of the anode electrode material representing a number of units of data of a certain classification; first means for causing a plating current pulse to flow between said anode electrode and a selected one of said cathode electrodes, said plating current pulse having a substantially fixed current-time integral for each unit of data of a certain classification to be accounted for, whereby the plated anode electrode material on said selected one of said cathode electrodes represents in amount a selected number of said units of data of said certain classification; second means for causing a deplating current, having a substantially fixed amplitude, to flow between a selected one of said cathode electrodes and said anode electrode, a change in potential in said second means indicating that said selected one of said cathode electrodes has been completely deplated; means responsive to said change in potential for controlling said second means to terminate said deplating current; a motor-driven counter for determining the time duration of said deplating current and for translating said time duration into a reading representing said selected number of said units of data of said certain classification previously represented on said selected cathode electrode, said motor-driven counter being operable while said deplating current is caused to flow between said selected one of said cathode electrodes and said anode electrode, and being rendered inoperable after termination of said deplating current; a printer operable to print on a receiving medium an indication corresponding to said reading of said motor-driven counter; and means for causing said printer to operate following termination of said deplating current.

2. An electrochemical data storage and counting system in accordance with claim 1 wherein there is provided means for controlling said second means to cause it to apply a deplating current successively between individual ones of said cathode electrodes and said anode electrode whereby successive readings on said motor-driven counter each represents a selected number of units of data of a classification accounted for, and said printer is operated to print on said receiving medium indications corresponding to said successive readings.

3. An electrochemical data storage and counting system for accounting for units of data of different classifications comprising: a storage device comprising a plurality of cathode electrodes of one material, an anode electrode of another material, and an electroplating bath for said electrodes, each of said plurality of cathode electrodes being capable of having stored thereon an amount of the anode electrode material representing a number of units of data of a certain classification; first means for causing a plating current pulse to flow between said anode electrode and a selected one of said cathode electrodes, said plating current pulse having a substantially fixed current-time integral for each unit of data of a certain classification to be accounted for, whereby the plated anode electrode material on said selected one of said cathode electrodes represents in amount a selected number of said units of data of said certain classification, said first means including a selector unit comprising a switching means associated with each of said cathode electrodes, and control means for controlling said switching means, whereby said plating current pulse may be caused to flow selectively between said anode electrode and any one of said cathode electrodes; second means for causing a deplating current, having a substantially fixed amplitude, to flow between a selected one of said cathode electrodes and said anode electrode, a change in potential in said second means indicating that said selected one of said cathode electrodes has been completely deplated, said second means including said selector unit comprising said switching means and said control means, whereby said deplating current may be caused to flow selectively between any of said cathode electrodes and said anode electrode; means responsive to said change in potential for controlling said second means to terminate said deplating current; a motor-driven counter for determining the time duration of said deplating current and for translating said time duration into a reading representing said selected number of said units of data of said certain classification previously represented on said selected cathode electrode, said motor-driven counter being operable while said deplating current is caused to flow between said selected one of said cathode electrodes and said anode electrode, and being rendered inoperable after termination of said deplating current; a printer operable to print on a receiving medium an indication corresponding to said reading of said motor-driven counter; and means for causing said printer to operate upon termination of said deplating current.

4. An electrochemical data storage and counting system for accounting for units of data of different classifications comprising: a storage device comprising a plurality of cathode electrodes of one material, an anode electrode of another material, and an electroplating bath for said electrodes, each of said plurality of cathode electrodes being capable of having stored thereon an amount of the anode electrode material representing a number of units of data of a certain classification; a pulse generator for developing direct current writing pulses each having a substantially fixed current-time integral when one unit of data is to be accounted for in a single writing operation, and having a current-time integral which is a multiple of said substantially fixed current-time integral depending upon the number of units of data to be acounted for in a single writing operation; first means operable when connected to said pulse generator for causing said direct current writing pulses to flow in one direction between said anode electrode and any selected one of said cathode electrodes to cause the material of said anode electrode to be plated on said selected one of said cathode electrodes, whereby said anode electrode material represents in amount a number of units of data of a certain classification; means for connecting said pulse generator to said first means for each writing operation; a source of direct current having a substantially fixed amplitude; second means operable when connected to said source of direct current for causing said direct current to flow in a direction opposite to said one direction between any selected one of said cathode electrodes and said anode electrode, a change in potential in said second means indicating that said selected one of said cathode electrodes has been completely deplated; means for connecting said source of direct current to said second means at the commencement of a readout operating; means responsive to said change in potential for making said last-named connecting means inoperative; and means for determining the time that said direct current was flowing between said selected one of said cathode electrodes and said anode electrode during said readout operation, and for translating said time into a reading representing said selected number of units of data of said certain classification previously represented on said selected cathode electrode.

5. An electrochemical data storage and counting system for accounting for units of data of different classifications comprising: a storage device comprising a plurality of cathode electrodes of one material, an anode electrode of another material, and an electroplating bath for said electrodes, each of said plurality of cathode electrodes being capable of having stored thereon an amount of the anode electrode material representing a number of units of data of a certain classification; a pulse generator for developing direct current writing pulses each having a substantially fixed current-time integral when one unit of data is to be accounted for in a single writing operation, and having a current-time integral which is a multiple of said substantially fixed current-time integral depending upon the number of units of data to be accounted for in a single writing operation; first means operable when connected to said pulse generator for causing said direct current writing pulses to flow in one direction between said anode electrode and any selected one of said cathode electrodes to cause the material of said anode electrode to be plated on said selected one of said cathode electrodes, whereby said anode electrode material represents in amount a number of units of data of a certain classification, said means including a selector unit comprising a switching means associated with each of said cathode electrodes, and control means for controlling said switching means, whereby said direct current writing pulses may be caused to flow selectively between said anode electrode and any of said cathode electrodes; and means for connecting said pulse generator to said first means for each writing operation.

6. An electrochemical data storage and counting system for accounting for units of data of different classifications comprising: a storage device comprising a plurality of cathode electrodes of one material, an anode electrode of another material, and an electroplating bath for said electrodes, each of said plurality of cathode electrodes being capable of having stored thereon an amount of the anode electrode material representing a number of units of data of a certain classification; a pulse generator for developing direct current writing pulses each having a substantially fixed current-time integral when one unit of data is to be accounted for in a single writing operation, and having a current-time integral which is a multiple of said substantially fixed current-time integral depending upon the number of units of data to be accounted for in a single writing operation; first means operable when connected to said pulse generator for causing said direct current writing pulses to flow in one direction between said anode electrode and any selected one of said cathode electrodes to cause material of said anode electrode to be plated on said selected one of said cathode electrodes, whereby said anode electrode material represents in amount a number of units of data of a certain classification, said first means including a selector unit comprising a switching means associated with each of said cathode electrodes, and control means for controlling said switching means, whereby said direct current writing pulses may be caused to flow selectively between said anode electrode and any of said cathode electrodes; means for connecting said pulse generator to said first means for each writing operation; a source of direct current having a substantially fixed amplitude; second means operable when connected to said source of direct current for causing said direct current to flow in a direction opposite to said one direction between any selected one of said cathode electrodes and said anode electrode, a change in potential in said second means indicating that said selected one of said cathode electrodes has been completely deplated, said second means including said selector unit comprising said switching means and said control means, whereby said direct current may be caused to flow selectively between any of said cathode electrodes and said anode electrode; means for connecting said source of direct current to said second means at the commencement of a readout operation; means responsive to said change in potential for making said last-named connecting means inoperative; and means for determining the time that said direct current was flowing between said selected one of said cathode electrodes and said anode electrode during said readout operation, and for translating said time into a reading representing said selected number of units of data of said certain classification previously represented on said selected cathode electrode.

7. An electrochemical data storage and counting system, comprising a storage device comprising at least one cathode electrode of one material, an anode electrode of another material, and an electroplating bath for said electrodes, said cathode electrode being capable of having stored thereon an amount of the anode electrode material representing a number of units of data; means for developing a plating current pulse having a substantially fixed current-time integral for each unit of data to be accounted for; plating circuit means for causing said plating current pulses to flow between said anode electrode and said cathode electrode, whereby the plated anode electrode material on said cathode electrode represents in amount a number of said units of data; means for developing a deplating current having a substantially fixed amplitude; deplating circuit means for causing said deplating current to flow between said cathode electrode and said anode electrode, a change in potential in said deplating circuit means indicating that said cathode electrode had been completely deplated; means responsive to said change in potential for controlling said deplating circuit means to terminate said deplating current; and means for determining the time duration of said deplating current and for translating said time duration into a reading representing said number of said units of data previously represented on said cathode electrode.

8. An electrochemical data storage and counting system comprising a storage device comprising at least one cathode electrode of one material, an anode electrode of another material, and an electroplating bath for said electrodes, said cathode electrode being capable of having stored thereon an amount of the anode electrode material representing a number of units of data; means for developing a plating current pulse having a substantially fixed current-time integral for each unit of data to be accounted for; plating circuit means for causing said plating current pulses to flow between said anode electrode and said cathode electrode, whereby the plated anode electrode material on said cathode electrode represents in amount a number of said units of data; means for developing a deplating current having a substantially fixed amplitude; deplating circuit means for causing said deplating current to flow between said cathode electrode and said anode electrode, a change in potential in said deplating circuit means indicating that said cathode electrode has been completely deplated; means responsive to said change in potential for controlling said deplating circuit means to terminate said deplating current; and a motor-driven means for determining the time duration of said deplating current and for translating said time duration into a reading representing said number of said units of data previously represented on said cathode electrode.

9. An electrochemical data storage and counting system for accounting for units of data of different classifications, comprising a storage device comprising a plurality of cathode electrodes of one material, an anode electrode of another material, and an electroplating bath for said electrodes, each of said plurality of cathode electrodes being capable of having stored thereon an amount of the anode electrode material representing a number of units of data of a certain classification; means for developing a plating current pulse having a substantially fixed current-time integral for each unit of data to be accounted for; means for causing said plating current pulses to flow between said anode electrode and any selected ones of said cathode electrodes, whereby the plated anode electrode material on a selected one of said cathode electrodes represents in amount a number of said units of data of a certain classification to be accounted for; means for developing a deplating current having a substantially fixed amplitude; means for causing said deplating current to flow between any selected ones of said cathode electrodes and said anode electrode; and means responsive to said deplating current for indicating the number of said units of data previously represented on any of said selected cathode electrodes.

10. An electrochemical data storage and counting system for accounting for units of data of different classifications, comprising a storage device comprising a plurality of cathode electrodes of one material, an anode electrode of another material, and an electroplating bath for said electrodes, each of said plurality of cathode electrodes being capable of having stored thereon an amount of the anode electrode material representing a number of units of data of a certain classification; means for developing a plating current pulse having a substantially fixed current-time integral for each unit of data to be accounted for; means for causing said plating current pulses to flow between said anode electrode and any selected ones of said cathode electrodes, whereby the plated anode electrode material on a selected one of said cathode electrodes represents in amount a number of said units of data of a certain classification to be accounted for; means for developing a deplating current having a substantially fixed amplitude; means for causing said deplating current to flow between any selected one of said cathode electrodes and said anode electrode, whereby any selected cathode electrode is completely deplated; and means for determining the time duration of each of said deplating currents and for translating said time durations into readings representing the number of units of data which may have been previously represented on each of the selected cathode electrodes.

11. An electrochemical data storage and counting system for accounting for units of data of different classifications, comprising a storage device comprising a plurality of cathode electrodes of one material, an anode electrode of another material, and an electroplating bath for said electrodes, each of said plurality of cathode electrodes being capable of having stored thereon an amount of the anode electrode material representing a number of units of data of a certain classification; means for developing a plating current pulse having a substantially fixed current-time integral for each unit of data to be accounted for; plating circuit means for causing said plating current pulses to flow between said anode electrode and any selected ones of said cathode electrodes, whereby the plated anode electrode material on a selected one of said cathode electrodes represents in amount a number of said units of data of a certain classification to be accounted for; means for developing a deplating current having a substantially fixed amplitude; deplating circuit means for causing said deplating current to flow between any selected ones of said cathode electrodes and said anode electrode, a change in potential in said deplating circuit means indicating that a selected one of said cathode electrodes has been completely deplated; means responsive to said change in potential for controlling said deplating circuit means to terminate said deplating current with respect to a selected one of said cathode electrodes; and means for determining the time duration of each of said deplating currents and for translating said time durations into readings representing the number of units of data which may have been previously represented on each of said selected cathode electrodes.

12. An electrochemical data storage and counting system for accounting for units of data of different classifications, comprising a storage device comprising a plurality of cathode electrodes of one material, an anode electrode of another material, and an electroplating bath for said electrodes, each of said plurality of cathode electrodes being capable of having stored thereon an amount of the anode electrode material representing a number of units of data of a certain classification; means for developing a plating current pulse having a substantially fixed current-time integral for each unit of data to be accounted for; plating circuit means for causing said plating current pulses to flow between said anode electrode and any selected ones of said cathode electrodes, whereby the plated anode electrode material on a selected one of said cathode electrodes represents in amount a number of said units of data of a certain classification to be accounted for; means for developing a deplating current having a substantially fixed amplitude; deplating circuit means for causing said deplating current to flow between any selected ones of said cathode electrodes and said anode electrode, a change in potential in said deplating circuit means indicating that a selected one of said cathode electrodes has been completely deplated; means responsive to said change in potential for controlling said deplating circuit means to terminate said deplating current with respect to a selected one of said cathode electrodes; and a motor-driven means for determining the time duration of each of said deplating currents and for translating said time durations into readings representing the number of said units of data which may have been previolsy represented on each of said selected cathode electrodes.

13. An electrochemical data storage counting system for accounting for units of data of different classifications, comprising a storage device comprising a plurality of cathode electrodes of one material, an anode electrode of another material, and an electroplating bath for said electrodes, each of said plurality of cathode electrodes being capable of having stored thereon an amount of the anode electrode material representing a number of units of data of a certain classification; means for developing a plating current pulse having a substantially fixed current-time integral for each unit of data to be accounted for; plating circuit means for causing said plating current pulses to flow between said anode electrode and any selected ones of said cathode electrodes, whereby the plated anode electrode material on a selected one of said cathode electrodes represents in amount a number of said units of data of a classification to be accounted for; means for developing a deplating current having a substantially fixed amplitude; deplating circuit means for causing said deplating current to flow between any selected ones of said cathode electrodes and said anode electrode, a change in potential in said deplating circuit means indicating that a selected one of said cathode electrodes has been completely deplated; means responsive to said change in potential for controlling said deplating circuit means to terminate said deplating current with respect to a selected one of said cathode electrodes; and a motor-driven counter for determining the time duration of each of said deplating currents and for translating said time durations into readings representing the number of said units of data which may have been previously represented on each of said selected cathode electrodes, said motor-driven counter being operable while said deplating current is caused to flow between a selected one of said cathode electrodes and said anode electrode and being rendered inoperable after the termination of said deplating current with respect thereto.

14. An electrochemical data storage and counting system in accordance with claim 13 wherein said cathode electrode material is platinum and said anode electrode material is copper.

15. An electrochemical data storage and counting system in accordance with claim 13 wherein said cathode electrode material is platinum, said anode electrode material is copper, and said electroplating bath is an aqueous solution comprising copper sulfate, sulfuric acid, and sodium sulfite.

16. An electrochemical data storage and counting system in accordance with claim 13 wherein there is provided means for controlling said deplating circuit means to cause said deplating current to be applied successively between individual ones of said cathode electrodes and said anode electrode, whereby successive readings on said motor-driven counter each represents a number of units of data of a classification accounted for.

17. An electrochemical data storage and counting system for accounting for units of data of different clasisfications, comprising a storage device comprising a plurality of cathode electrodes of one material, an anode electrode of another material, and an electroplating bath for said electrodes, each of said plurality of cathode electrodes being capable of having stored thereon an amount of the anode electrode material representing a number of units of data of a certain classification; means for developing a plating current pulse having a substantially fixed current-time integral for each unit of data to be accounted for; plating circuit means for causing said plating current pulses to flow between said anode electrode and any selected ones of said cathode electrodes, whereby the plated anode electrode material on a selected one of said cathode electrodes represents in amount a number of said units of data of a certain classification to be accounted for, said plating circuit means including a selector unit comprising a switching means associated with each of said cathode electrodes, and control means for controlling said switching means, whereby said plating current pulses may be caused to flow selectively between said anode electrode and any one of said cathode electrodes; means for developing a deplating current having a substantially fixed amplitude; deplating circuit means for causing said deplating current to flow between any selected ones of said cathode electrodes and said anode electrode, said deplating circuit means including said selector unit comprising said switching means and said control means, whereby said deplating current may be caused to flow selectively between any of said cathode electrodes and said anode electrode; and means responsive to said deplating current for indicating the number of said units of said data which may have been previously represented on any of said selected cathode electrodes.

18. An electrochemical data storage and counting system for accounting for uints of data of different clasisfications, comprising a storage device comprising a plurality of cathode electrodes of one material, an anode electrode of another material, and an electroplating bath for said electrodes, each of said plurality of cathode electrodes being capable of having stored thereon an amount of the anode electrode material representing a number of units of data of a certain classification; means for developing a plating current pulse having a substantially fixed current-time integral for each unit of data to be accounted for; plating circuit means for causing said plating current pulses to flow between said anode electrode and any selected ones of said cathode electrodes, whereby the plated anode electrode material on a selected one of said cathode electrodes represents in amount a number of said units of data of a certain classification to be accounted for, said plating circuit means including a selector unit comprising a switching means associated with each of said cathode electrodes, and control means for controlling said switching means, whereby said plating current pulses may be caused to flow selectively between said anode electrode and any of said cathode electrodes; means for developing a deplating current having a substantially fixed amplitude; deplating circuit means for causing said deplating current to flow between any selected ones of said cathode electrodes and said anode electrode, a change in potential in said deplating circuit means indicating that a selected one of said cathode electrodes has been completely deplated, said deplating circuit means including said selector unit comprising said switching means and said control means, whereby said deplating current may be caused to flow selectively between any of said cathode electrodes and said anode electrode; means responsive to said change in potential for controlling said deplating circuit means to terminate said deplating current with respect to a selected one of said cathode electrodes; and means for determining the time duration of each of said deplating currents and for translating said time durations into readings representing the number of said units of data which may have been previously represented on each of said selected cathode electrodes.

19. An electrochemical data storage and counting system for accounting for units of data of different classifications, comprising a storage device comprising a plurality of cathode electrodes of one material, an anode electrode of another material, and an electroplating bath for said electrodes, each of said plurality of cathode electrodes being capable of having stored thereon an amount of the anode electrode material representing a number of units of data of a certain classification; means for developing a plating current pulse having a subtantially fixed current-time integral for each unit of data to be accounted for; plating circuit means for causing said plating current pulses to flow between said anode electrode and any selected ones of said cathode electrodes, whereby the plated anode electrode material on a selected one of said cathode electrodes represents in amount a number of said units of data of a certain classification to be accounted for, said plating circuit means including a selector unit comprising a switching means associated with each of said cathode electrodes, and control means for controlling said switching means, whereby said plating current pulses may be caused to flow selectively between said anode electrode and any one of said cathode electrodes; means for developing a deplating current having a substantially fixed amplitude; deplating circuit means for causing said deplating current to flow between any selected ones of said cathode electrodes and said anode electrode, a change in potential in said deplating circuit means indicating that a selected one of said cathode electrodes has been completely deplated, said deplating circuit means including said selector unit comprising said switching means and said control means, whereby said deplating current may be caused to flow selectively between any one of said cathode electrodes and said anode electrode; means responsive to said change in potential for controlling said deplating circuit means to terminate said deplating current with respect to a selected one of said cathode electrodes; and a motor-driven counter for determining the time duration of each of said deplating currents and for translating said time durations into readings representing the number of said units of data which may have been previously represented on each of said selected cathode electrodes, said motor-driven counter being operable while said deplating current is caused to flow between a selected one of said cathode electrodes and said anode electrode, and being rendered inoperable upon termination of said deplating current with respect thereto.

20. An electrochemical data storage and counting system for accounting for units of data of different classifications, comprising a storage device comprising a plurality of cathode electrodes of one material, an anode electrode of another material, and an electroplating bath for said electrodes, each of said plurality of cathode electrodes being capable of having stored thereon an amount of the anode electrode material representing a number of units of data of a certain classification; means for developing a plating current pulse having a substantially fixed current-time integral for each unit of data to be accounted for; plating circuit means for causing said plating current pulses to flow between said anode electrode and any selected ones of said cathode electrodes, whereby the plated anode electrode material on a selected one of said cathode electrodes represents in amount a number of said units of data of a certain classification to be accounted for, said plating circuit means including a selector unit comprising a switching means associated with each of said cathode electrodes, and control means for controlling said switching means, whereby said plating current pulses may be caused to flow selectively between said anode electrode and any one of said cathode electrodes; a data entry means, including a plurality of classification control switching means which are settable to control operation of said control means, and including keys for controlling the setting of said classification control switching means; means for developing a deplating current having a substantially fixed amplitude; deplating circuit means for causing said deplating current to flow between any selected ones of said cathode electrodes and said anode electrode, a change in potential in said deplating circuit means indicating that a selected one of said cathode electrodes has been completely deplated, said deplating circuit means including said selector unit comprising said switching means and said control means, whereby said deplating current may be caused to flow selectively between any one of said cathode electrodes and said anode electrode; means responsive to said change in potential for controlling said deplating circuit means to terminate said deplating current with respect to a selected one of said cathode electrodes; and means for determining the time duration of each of said deplating currents and for translating said time durations into readings representing the number of units of data which may have been previously represented on each of the selected cathode electrodes.

21. An electrochemical data storage and counting system for accounting for units of data of different classifications, comprising a storage device comprising a plurality of cathode electrodes of one material, an anode electrode of another material, and an electroplating bath for said electrodes, each of said plurality of cathode electrodes being capable of having stored thereon an amount of the anode electrode material representing a number of units of data of a certain classification; means for developing a plating current pulse having a substantially fixed current-time integral for each unit of data to be accounted for; plating circuit means for causing said plating current pulses to flow between said anode electrode and any selected ones of said cathode electrodes, whereby the plated anode electrode material on a selected one of said cathode electrodes represents in amount a number of said units of data of a certain classification to be accounted for; means for developing a deplating current having a substantially fixed amplitude; deplating circuit means for causing said deplating current to flow between any selected ones of said cathode electrodes and said anode electrode, a change in potential in said deplating circuit means indicating that a selected one of said cathode electrodes has been completely deplated; voltage comparator means coupled to said deplating circuit means, said voltage comparator means including means for detecting said change in potential, and including a relay energized when said change in potential is detected by said detecting means; said deplating circuit means including switching means, operable when said relay is energized, to effect termination of said deplating current with respect to a selected one of said cathode electrodes; and means for determining the time duration of each of said deplating currents and for translating said time durations into readings representing the number of units of data which have been previously represented on each of said selected cathode electrodes.

22. An electrochemical data storage and counting system for accounting for units of data of different classifications, comprising a storage device comprising a plurality of cathode electrodes of one material, an anode electrode of another material, and an electroplating bath for said electrodes, each of said plurality of cathode electrodes being capable of having stored thereon an amount of the anode electrode material representing a number of units of data of certain classification; means for developing a plating current pulse having a substantially fixed current-time integral for each unit of data to be accounted for; plating circuit means for causing said plating current pulses to flow between said anode electrode and any selected ones of said cathode electrodes, whereby the plated anode electrode material on a selected one of said cathode electrodes represents in amount a number of said units of data of a certain classification to be accounted for, said plating circuit means including a selector unit comprising a switching means associated with each of said cathode electrodes, and control means for controlling said switching means, whereby said plating current pulses may be caused to flow selectively between said anode electrode and any one of said cathode electrodes; means for developing a deplating current having a substantially fixed amplitude; deplating circuit means for causing said deplating current to flow between any selected ones of said cathode electrodes and said anode electrode, a change in potential in said deplating circuit means indicating that a selected one of said cathode electrodes has been completely deplated, said deplating circuit means including said selector unit comprising said switching means and said control means, whereby said deplating current may be caused to flow selectively between any one of said cathode electrodes and said anode electrode; voltage comparator means coupled to said deplating circuit means, said voltage comparator means including means for detecting said change in potential, and including a relay energized when said change in potential is detected by said detecting means; said deplating circuit means including switching means operable when said relay is energized to effect termination of said deplating current with respect to a selected one of said cathode electrodes; and means for determining the time duration of each of said deplating currents and for translating said time durations into readings representing the number of units of data which may have been previously represented on each of said cathode electrodes.

23. An electrochemical data storage and counting system for accounting for units of data of different classifications, comprising a storage device comprising a plurality of cathode electrodes of one material, an anode electrode of another material, and an electroplating bath for said electrodes, each of said plurality of cathode electrodes being capable of having stored thereon an amount of the anode electrode material representing a number of units of data of a certain classification; means for developing a plating current pulse having a substantially fixed current-time integral for each unit of data to be accounted for; plating circuit means for causing said plating current pulses to flow between said anode electrode and any selected ones of said cathode electrodes, whereby the plated anode electrode material on a selected one of said cathode electrodes represents in amount a number of such units of data of a certain classification to be accounted for, said plating circuit means including a selector unit comprising a switching means associated with each of said cathode electrodes and control means for controlling said switching means, whereby said plating current pulses may be caused to flow selectively between said anode electrode and any one of said cathode electrodes; a data-entry means, including a plurality of classification control switching means which are settable to control operation of said control means, and including keys for controlling the setting of said classification control switching means; means for developing a deplating current having a substantially fixed amplitude; deplating circuit means for causing said deplating current to flow between any selected ones of said cathode electrodes and said anode electrode, a change in potential in said deplating circuit means indicating that a selected one of said cathode electrodes has been completely deplated, said deplating circuit means including said selector unit comprising said switching means and said control means, whereby said deplating current may be caused to flow selectively between any one of said cathode electrodes and said anode electrode; voltage comparator means coupled to said deplating circuit means, said voltage comparator means including means for detecting said change in potential, and including a relay energized when said change in potential is detected by said detecting means; said deplating circuit means including switching means operable when said relay is energized to effect termination of said deplating current with respect to a selected one of said cathode electrodes; and means for determining the time duration of each of said deplating currents and for translating said time durations into readings representing the number of units of data which may have been previously represented on each of said selected cathode electrodes.

24. An electrochemical data storage and counting system for accounting for units of data of different classifications, comprising a storage device comprising a plurality of cathode electrodes of one material, an anode electrode of another material, and an electroplating bath for said electrodes, each of said plurality of cathode electrodes being capable of having stored thereon an amount of the anode electrode material representing a number of units of data of a certain classification; means for developing a plating current pulse having a substantially fixed current-time integral for each unit of data to be accounted for; plating circuit means for causing said plating current pulses to flow between said anode electrode and any selected ones of said cathode electrodes, whereby the plated anode electrode material on a selected one of said cathode electrodes represents in amount a number of said units of data of a certain classification to be accounted for, said plating circuit means including a selector unit comprising a switching means associated with each of said cathode electrodes, and control means for controlling said switching means, whereby said plating current pulses may be caused to flow selectively between said anode electrode and any one of said cathode electrodes; means for developing a deplating current having a substantially fixed amplitude; deplating circuit means for causing said deplating current to flow between any selected ones of said cathode electrodes and said anode electrode, a change in potential in said deplating circuit means indicating that a selected one of said cathode electrodes has been completely deplated, said deplating circuit means including said selector unit comprising said switching means and said control means, whereby said deplating current may be caused to flow selectively between any one of said cathode electrodes and said anode electrode; voltage comparator means coupled to said deplating circuit means, said voltage comparator means including means for detecting said change in potential, and including a first relay and a second relay each energized when said change in potential is detected by said detecting means; said control means being operated automatically each time said first relay is energized whereby said deplating circuit means causes said deplating current to flow successively between an individual one of said cathode electrodes and said anode electrode; said deplating circuit means including switching means operable each time said first relay is energized to effect termination of said deplating current with respect to a selected cathode electrode; and means for determining the time duration of each of said deplating currents and for translating each of said time durations into successive readings on said indicating means, each of said successive readings representing a number of said units of data which may have been previously represented on a selected cathode electrode.

25. An electrochemical data storage and counting system for accounting for units of data of different classifications, comprising a storage device comprising a plurality of cathode electrodes of one material, an anode electrode of another material, and an electroplating bath for said electrodes, each of said plurality of cathode electrodes being capable of having stored thereon an amount of the anode electrode material representing a number of units of data of a certain classification; means for developing a plating current pulse having a substantially fixed current-time integral for each unit of data to be accounted for; plating circuit means for causing said plating current pulses to flow between said anode electrode and any selected ones of said cathode electrodes, whereby the plated anode electrode material on a selected one of said cathode electrodes represents in amount a number of said units of data of a certain classification to be accounted for, said plating circuit means including a selector unit comprising a switching means associated with each of said cathode electrodes, and control means for controlling said switching means, whereby said plating current pulses may be caused to flow selectively between said anode electrode and any one of said cathode electrodes; a data-entry means, including a plurality of classification control switching means which are settable to control operation of said selector unit control means, including keys for controlling the setting of said classification control switching means, including a plurality of plating current control switching means which are settable to control said plating circuit means whereby a plating current pulse having a current-time integral which is a multiple of said substantially fixed current-time integral may be caused to flow between said anode electrode and a selected one of said cathode electrodes during a single storing operation, and including keys for controlling the setting of plating current control switching means; means for developing a deplating current having a substantially fixed amplitude; deplating circuit means for causing said deplating current to flow between any selected ones of said cathode electrodes and said anode electrode, a change in potential in said deplating circuit means indicating that a selected one of said cathode electrodes has been completely deplated, said deplating circuit means including said selector unit comprising said switching means and said control means, whereby said deplating current may be caused to flow selectively between any of said cathode electrodes and said anode electrode; means responsive to said change in potential for controlling said deplating circuit means to terminate said deplating current with respect to a selected one of said cathode electrodes; and means for determining the time duration of each of said deplating currents and for translating said time durations into readings representing the number of units of data which may have been previously represented on each of said selected cathode electrodes.

26. An electrochemical data storage and counting system for accounting for units of data of different classifications, comprising a storage device comprising a plurality of cathode electrodes of one material, an anode electrode of another material, and an electroplating bath for said electrodes, each of said plurality of cathode electrodes being capable of having stored thereon an amount of the anode electrode material representing a number of units of data of a certain classification; means for developing a plating current pulse having a substantially fixed current-time integral for each unit of data to be accounted for; plating circuit means for causing said plating current pulses to flow between said anode electrode and any selected ones of said cathode electrodes, whereby the plated anode electrode material on a selected one of said cathode electrodes represents in amount a number of said units of data of a certain classification to be accounted for, said plating circuit means including a selector unit comprising a switching means associated with each of said cathode electrodes, and control means operable to control said switching means, whereby said plating current pulses may be caused to flow selectively between said anode electrode and any one of said cathode electrodes; a data-entry means, including a plurality of classification control switching means which are settable to control operation of said control means, including keys for controlling the setting of said classification control switching means, including a plurality of plating current control switching means which are settable to control said plating circuit means, whereby a plating current pulse having a current-time integral which is a multiple of said substantially fixed current-time integral may be caused to flow between said anode electrode and a selected one of said cathode electrodes during a single storing operation, including keys for controlling the setting of said plating current control switching means, and including means operable to initiate operation of said data-entry means to control operation of said plating circuit means and to control operation of said control means; means for developing a deplating current having a substantially fixed amplitude; deplating circuit means for causing said deplating current to flow between any selected ones of said cathode electrodes and said anode electrode, a change in potential in said deplating circuit means indicating that a selected one of said cathode electrodes has been completely deplated, said deplating circuit means including said selector unit comprising said switching means and said control means, whereby said deplating current may be caused to flow selectively between any of said cathode electrodes and said anode electrode; means to cause said deplating circuit means to operate during a read-out operation; means to cause said control means to operate during a read-out operation; means responsive to said change in potential for controlling said deplating circuit means to terminate said deplating current with respect to a selected one of said cathode electrodes; a motor-driven counter for determining the time duration of each of said deplating currents and for translating said time durations into readings representing the number of units of data which may have been previously represented on each of said selected cathode electrodes, said motor-driven counter being operable while said deplating current is flowing between a selected one of said cathode electrodes and said anode electrode, and being rendered inoperable after termination of said deplating current with respect thereto.

27. An electromechanical data storage and counting system for accounting for units of data of different classifications, comprising a storage device comprising a plurality of cathode electrodes of one material, an anode electrode of another material, and an electroplating bath for said electrodes, each of said plurality of cathode electrodes being capable of having stored thereon an amount of the anode electrode material representing a number of units of data of a certain classification; means for developing a plating current pulse having a substantially fixed current-time integral for each unit of data to be accounted for; plating circuit means for causing said plating current pulses to flow between said anode electrode and any selected ones of said cathode electrodes, whereby the plated anode electrode material on a selected one of said cathode electrodes represents in amount a number of said units of data of a certain classification to be accounted for, said plating circuit means including a selector unit comprising a switching means associated with each of the cathode electrodes, and control means operable to control said switching means, whereby said plating current pulses may be caused to flow selectively between said anode electrode and any of said cathode electrodes; a data-entry means, including a plurality of classifications of control switching means, which are settable to control operation of said control means, including keys for controlling the setting of said classification control switching means, which are settable to control said plating circuit means whereby a plating current pulse, having a current-time integral, which is a multiple of said substantially fixed current-time integral, may be caused to flow between said anode electrode and a selected one of said cathode electrodes during a single storing operation, including keys for controlling the setting of said plating current control switching means, including means operable to initiate operation of said data-entry means to control operation of said plating circuit means and to control operation of said control means, and including time delay switching means operated a fixed time after said initiating means is operated to cause said plating circuit means to operate; means for developing a deplating current having a substantially fixed amplitude; deplating circuit means for causing said deplating current to flow between any selected ones of said cathode electrodes and said anode electrode, a change in potential in said deplating circuit means indicating that a selected one of said cathode electrodes has been completely deplated, said deplating circuit means including said selector unit comprising said switching means and said control means, whereby said deplating current may be caused to flow selectively between any one of said cathode electrodes and said anode electrode; means to cause said deplating circuit means to operate during a read-out operation; means to cause said control means to operate during a read-out operation; means responsive to said change in potential for controlling said deplating circuit means to terminate said deplating current with respect to a selected one of said cathode electrodes; a motor-driven counter for determining the time duration of each of said deplating currents and for translating said time durations into readings representing the number of units of data which may have been previously represented on each of said selected cathode electrodes, said motor-driven counter being operable while said deplating current is flowing between a selected one of said cathode electrodes and said anode electrode, and being rendered inoperable after termination of said deplating current with respect thereto.

Referencces Cited in the file of this patent

UNITED STATES PATENTS

| | | |
|---|---|---|
| 240,678 | Edison | Apr. 26, 1881 |
| 1,527,095 | Turnock | Feb. 17, 1925 |
| 1,712,284 | Turnock | May 7, 1929 |
| 2,685,025 | Root | July 27, 1954 |
| 2,827,623 | Ainsworth | Mar. 18, 1958 |
| 2,885,659 | Spielberg | May 5, 1959 |

UNITED STATES PATENT OFFICE

CERTIFICATE OF CORRECTION

Patent No. 3,125,673 March 17, 1964

William H. Puterbaugh et al.

It is hereby certified that error appears in the above numbered patent requiring correction and that the said Letters Patent should read as corrected below.

Column 2, lines 31 and 32, for "combination" read -- combinations --; column 3, line 69, for "185" read -- 815 --; column 11, line 71, for "releaesd" read -- released --; column 12, line 52, for "wtih" read -- with --; column 16, line 37, for "uits" read -- units --; lines 42 and 44, for '"O"', each occurrence, read -- "OO" --; column 18, line 30, for "comprises" read -- comprise --; column 20, line 14, for "devices" read -- device --; line 19, for "cope" read -- scope --; column 23, line 22, for "operating" read -- operation --; column 26, line 59, for "previoulsy" read -- previously --; column 27, lines 42 and 43, and column 28, lines 2 and 3, for "clasisfications", each occurrence, read -- classifications --; column 28, line 2, for "uints" read -- units --; line 52, for "subtantially" read -- substantially --.

Signed and sealed this 28th day of July 1964.

(SEAL)
Attest:

ESTON G. JOHNSON
Attesting Officer

EDWARD J. BRENNER
Commissioner of Patents